(12) United States Patent
Klausner

(10) Patent No.: US 12,443,395 B2
(45) Date of Patent: *Oct. 14, 2025

(54) COMPUTING EXPRESSION MEDIUM, DEVELOPMENT ENVIRONMENT, AND DEVICE COMMUNICATION AND CONTROL ARCHITECTURE

(71) Applicant: James L. Bosworth, Hoboken, NJ (US)

(72) Inventor: Sanford Klausner, San Francisco, CA (US)

(73) Assignee: James L. Bosworth, Hoboken, NJ (US)

( * ) Notice: Subject to any disclaimer, the term of this patent is extended or adjusted under 35 U.S.C. 154(b) by 911 days.

This patent is subject to a terminal disclaimer.

(21) Appl. No.: 17/496,957

(22) Filed: Oct. 8, 2021

(65) Prior Publication Data

US 2022/0035604 A1  Feb. 3, 2022

Related U.S. Application Data

(63) Continuation of application No. 16/774,173, filed on Jan. 28, 2020, now Pat. No. 11,169,784, which is a
(Continued)

(51) Int. Cl.
*G06F 8/34* (2018.01)

(52) U.S. Cl.
CPC ..................... *G06F 8/34* (2013.01)

(58) Field of Classification Search
CPC ........................................................ G06F 8/34
See application file for complete search history.

(56) References Cited

U.S. PATENT DOCUMENTS 5,499,371 A * 3/1996 Henninger ................ G06F 8/24
707/999.102
5,948,040 A    9/1999 Delorme et al.
(Continued)

FOREIGN PATENT DOCUMENTS

WO   WO-2013137884 A1 * 9/2013 ........... G05B 19/054

OTHER PUBLICATIONS

Cubicon: Trusted Infrastructure for the Ambient Cloud; https://web.archive.org/web/20120105205727/https://www.nist.gov/nstic/governance-comments/Cubicon-NSTIC_2011Aug15.pdf; 17 pages (Year: 2012).
(Continued)

*Primary Examiner* — Kevin L Young
*Assistant Examiner* — Kimberly L Jordan
(74) *Attorney, Agent, or Firm* — Barich IP Law Group

(57) ABSTRACT

During a process called live design, a computing system may receive, from a repository, an instance of a first component comprising a first set of one or more metaobjects that provides a binary representation of the instance of the first component. In turn, the computing system may render the instance of the first component as an icon and a first set of one or more underlying panes that provide a visual expression of the instance of the first component. The computing system may then receive, via the first set of one or more underlying panes, a user modification to the instance of the first component. Thereafter, the computing device and/or the repository may determine whether the user modification to the instance of the first component is valid, and may process the user modification in accordance with the determining.

18 Claims, 33 Drawing Sheets
(31 of 33 Drawing Sheet(s) Filed in Color)

Related U.S. Application Data continuation of application No. 14/740,185, filed on Jun. 15, 2015, now Pat. No. 10,649,742.

(60) Provisional application No. 62/012,255, filed on Jun. 13, 2014.

(56) References Cited

U.S. PATENT DOCUMENTS

| | | |
|---|---|---|
| 2009/0037368 A1 | 2/2009 | Petride |
| 2011/0088019 A1 | 4/2011 | Jedlicka |
| 2015/0268948 A1 | 9/2015 | Plate |

OTHER PUBLICATIONS

Maik Schott, Jana Dittmann, Claus Vielhauer, Christian Kratzer, Andreas Lang; Integrity and Authenticity for Digital Long-term Preservation in Irods Grid Infrastructure; 14 pages (Year: 2008).
Cubicon: a clean slate IoT architecture; archived Jan. 21, 2013; 4 pages; http ://web .archive .org/web/20130121080037 /http:// theinternetofthings.eu/sites/default/fi les/%5 Buser-name%5D/Iot% 20Council%20Sandy%20Klausner%20interview1 .pdf (Year: 2013).

\* cited by examiner

Figure 13

| | Reach | Label | Slot Name | Value | Options |
|---|---|---|---|---|---|
| Template Attribute | | P0 | *pointer | 00000 0000 | *pointer P |
| ~Method Attribute | | P0 | ~*pointer | 00000 0000 | *pointer P |
| Object Link | | 0T | Object Template | NULL | Object Item P |
| ~Accessor Method | | PA | *public accessor () | 0000 0000 | public P |
| Activator Method | | PA | | | public P |
| Literal | | | truth | UNSET | P |
| Command | | AC | activator | message | Network |
| CASE Method | | CR | ~case result () | | P call |
| Rescuer Method | | AG | accessor (A B C) | | accessor rescuer |
| Concept Map | | C Map | Software Repository Name | | Software Repository |
| Signal (dataflow) | signal | SI | signal | | (b) source Optional |
| Timer | temporal | TI | timer | | state timer |
| Physical Port | input | IP | port | | in |
| Closure | | window | Closure | | User Frame |
| Complex (Database) | | Matrix | ATTRIBUTE | | 1 dimension |
| Composition | | | Composite | | |
| Process Task | Modes | | Origin | | Origin thread |
| Virtual Equation | | | virtual equation arithmetic | 0 | |
| Step | | | sequencer/arithmetic | | |
| Method Segment Field | | AE | L0 (accessor field) | UNSET | |
| Collection/List Total | | | L COLLECTION | | 0 |
| Domain Exception | | | domain exception | | |
| Virtual Machine | | | Virtual Machine | | |
| Connector | | | Connector Name | | |
| Control-flow Slot (Conslot) | transfer | No value | Closure Template | | CLOSURE |
| | transfer | VA | ~*whole accessor | | MESSAGE |
| | T | 0I | Object Instance Name | Object x | QUERY |
| | | 0I | Object Instance Name | Object x | TRANSACT |
| | container | LS | left stop position | UNSET | CONTAINER |
| | struct | E1 | equal 1.0 arm | UNSET | STRUCTURE |
| | or stem | OS | branch/leaf BB | 0 | OR STEM |
| | context | MI | module instance byte total | 0 | CONTEXT |

Figure 14

COMPUTING EXPRESSION MEDIUM, DEVELOPMENT ENVIRONMENT, AND DEVICE COMMUNICATION AND CONTROL ARCHITECTURE

CROSS REFERENCE TO RELATED APPLICATIONS

This application is a continuation of U.S. patent application Ser. No. 16/774,173, filed Jan. 28, 2020, entitled "Computing Expression Medium, Development Environment, and Device Communication and Control Architecture," which is a continuation of U.S. patent application Ser. No. 14/740,185, filed Jun. 15, 2014, entitled "Computing Expression Medium, Development Environment, and Device Communication and Control Architecture," now U.S. Pat. No. 10,649,742, which claims priority to U.S. Provisional Application No. 62/012,255 filed Jun. 13, 2014, entitled "Computing Expression Medium, Development Environment, and Device Communication and Control Architecture," which are hereby incorporated by reference in their entirety.

BACKGROUND

Over the past sixty years, programming languages have evolved from a handful of low-level and mid-level languages, such as Assembler Languages, COBOL and Fortran, to the hundreds of high-level languages in use today.

Programming languages—which may be referred to herein as source languages—are traditionally expressed in source code. Source code is traditionally expressed in lines of ASCII characters (English alphabet, numbers 0-9, and symbols). Machines, however, execute target languages, which are traditionally expressed as object code, which is itself in binary form (zeros and ones). Typically, a compilation process is needed to "translate" source language into object code, the language the machine understands. The compiler plays a role similar to a human language interpreter as it "translates" one language into another, thereby acting as the "middleman" between the program and the processor on which the program is intended to execute. The compilation process may involve a series of complex processes, which may include syntactical analysis, preprocessing, parsing, semantic analysis, code generation and optimization.

During its first pass, the compiler demarcates and classifies each string of ASCII characters as a declaration or statement, analyzing syntax to assure that the program is correctly structured according to rules built into the compiler's tokenizer; a process commonly known as syntactic analysis, resulting in the creation of a symbol table composed of tokens.

Following syntactic analysis, the compiler typically makes subsequent passes on the symbol tables to generate object code, part of a process known as semantic analysis. Tokens are often the product of different or incompatible compilers, and as such are typically discarded after each use, along with the source code's original purpose (design intent).

One possible solution for permanently capturing the design intent of software would be to develop a programming language whose medium of expression graphically depicts program declarations and statements (syntax) and captures a program's meaning (semantics) in the form of reusable tokens. One possible embodiment for a reusable token may be a software component.

Over the past four decades, the software industry has attempted to create standardized software components used four fundamental approaches: object-oriented programming, multi-paradigm programming, graphical programming, and component-based development.

Object-oriented Programming (OOP)—OOP was developed at Xerox PARC in the 1970s as a way to create modular, reusable software for large-scale reuse. C++, Objective-C, Smalltalk, Java, C#, Perl, Python, Ruby and PHP are current examples of object-oriented programming languages. OOP provides a structure for programs, a framework for code libraries, and makes it easier to maintain and modify existing source code. From a modeling perspective, object classes support the encapsulation of data and methods, inheritance, and polymorphism.

Multi-paradigm Programming—A programming paradigm may best be described as a "style" or "way" of programming, typically dictating the design of a program's structures and behaviors. Common paradigms include object-orientation, imperative, declarative, functional, logic, and symbolic. As systems become more complex over time, it has become increasingly important for languages to support multiple programming styles.

Graphical Programming—Supplementing text with graphics significantly increases the amount of information that can be conveyed in a limited amount of space, hence the expression "a picture is worth a thousand words." The World Wide Web's adoption of a graphical user interface (GUI) was instrumental to its meteoric rise in popularity. Surprisingly, software development may be the last bastion of computing to effectively exploit the power of visualization.

Component-based Development—Component-based Development (CBD) is a branch of software engineering that drives standards for component implementation, documentation and deployment. Examples of component models include Enterprise JavaBeans (EJB) model, Component Object Model (COM) model, .NET model and. Common Object Request Broker Architecture (CORBA). Typically, CBD takes a reuse-based approach to defining, implementing, and composing systems from loosely coupled components.

With increasing levels of systems complexity due in no small part to the introduction of the Internet of Things—the need is greater than ever to develop systems from standardized, reusable software components. The introduction of assembly line manufacturing of goods from standardized components ignited the American Industrial Revolution in the nineteenth century. By the same token, the introduction of assembly line manufacturing of digital goods from standardized software components may ignite a new Internet Revolution in the twenty-first century.

SUMMARY

Disclosed herein is a new suite of technologies for enabling the design, transmission, and execution of software.

One aspect of the present disclosure may take the form of a method that involves a computing system (a) receiving, from a repository, an instance of a first component (e.g., a copy of an original instance of the first component that is stored in the repository), where the instance of the first component comprises a first set of one or more metaobjects that provides a binary representation of the instance of the first component, (b) rendering the instance of the first component as an icon and a first set of one or more underlying panes that provide a visual expression of the instance of the first component, (c) receiving, via the first set of one or more underlying panes, a user modification to the instance of the first component (e.g., a new value entered into a predefined field of the first set of one or more underlying panes), (d) determining whether the user modification to the instance of the first component is valid semantically valid), and (e) processing the user modification in accordance with the determining.

In one example, the step of determining whether the user modification to the instance of the first component is valid may involve determining that the user modification is invalid. According to this example, the step of processing the user modification in accordance with the determining may then involve rejecting the user modification and displaying a notification indicating that the user modification has been rejected.

In another example, the step of determining whether the user modification to the instance of the first component is valid may involve determining that the user modification is valid. According to this example, the step of processing the user modification in accordance with the determining may then involve transmitting the user modification to the repository. And in turn, the method may the further involve (i) receiving, from the repository, an indication that the repository has made a further determination of whether the user modification is valid, and (ii) displaying a notification indicating results from the further determination by the repository.

In yet another example, the first component may be linked to a second component, in which case the method may further involve (i) receiving, from the repository, an instance of the second component that comprises a second set of one or more metaobjects, and (ii) rendering the second set of one or more metaobjects as a slot icon in the first set of one or more panes and a second set of one or more underlying panes that provide a visual expression of the second set of one or more metaobjects.

Another aspect of the present disclosure may take the form of a method that involves a repository (a) sending, to a computing system, an instance of a first component (e.g., a copy of an original instance of the first component that is stored in the repository), wherein the instance of the first component comprises a first set of one or more metaobjects that provides a binary representation of the instance of the first component, (b) receiving, from the computing system, a user modification to the instance of the first component, (c) determining whether the user modification to the instance of the first component is valid (e.g., semantically valid), and (d) processing the user modification in accordance with the determining.

In one example, the step of determining whether the user modification to the instance of the first component is valid may involve determining that the user modification is valid. According to this example, the step of processing the user modification in accordance with the determining may then involve updating the original instance of the first component based on the user modification.

The method may include various other functions as well. For example, the method may additionally involve the repository transmitting, to the computing system, a notification of whether the user modification is valid. As another example, the method may additionally involve the repository (i) locking the original instance of the first component, (ii) receiving, from the computing device, an instruction to release the original instance of the first component, and (iii) in response to the instruction, the repository releasing the lock on the original instance of the first component.

Yet another aspect of the present disclosure may take the form of devices and/or non-transitory computer readable medium having instructions stored thereon that are executable by a processor to cause a computer system and/or a repository to carry out features disclosed herein.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

Please note that this patent or application file contains at least one drawing executed in color. Copies of this patent or patent application publication with color drawing(s) will be provided by the Office upon request and payment of the necessary fee.

FIGS. 12-13 depict different categories of component types that may be predefined and used in one example implementation of the disclosed systems language;

FIG. 14 depicts different categories of slot types that may be predefined and used in one example implementation in one example implementation of the disclosed systems language;

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

1. Introduction

Disclosed herein is a new suite of technologies, generally referred to as "Cubicon," which may enable the design, transmission, and execution of software.

One aspect of the present disclosure includes methods and systems for automating the development of software systems using a new Cubicon systems language that is built an a predefined set of component types.

In general, a Cubicon component may be considered a discrete piece of software whose principal characteristic is the ability to separate its representation (what the machine executes) and its expression (what the human sees), fused like two sides of a coin. In practice, a component's representation make generally take the form of one or more metaobjects that are stored in a software repository, and the component's expression may take the form of graphical elements (e.g., an icon and one or more underlying panes) that are rendered by an integrated development environment (IDE) (which may be referred to as the Systems Cube Model IDE) based on the component's one or more metaobjects.

The disclosed systems language may be "reflexive," meaning the systems language is composed of itself. Templates that specify the systems language (which may be referred to as component templates) may themselves be specified as templates (which may be referred to as component metatemplates). The same bytecode may be used to (locally) simulate and (remotely) execute a program's threads of control, attribute values, and states—which may be another example of the system language's reflexive nature.

In a Cubicon system, software may be created by placing multiple components into a software "package" (e.g., a "app" or a "module context") during a process referred to as "live design." The disclosed live design process may automate the software development process by performing "live" syntactic and/or semantic analysis on a component in lockstep with each developer action, as an alternative to compiling on an incremental basis.

In a Cubicon System, a software package may then be "distilled" for processing in a machine running a Cubicon virtual machine (VM). In practice, distilling extracts necessary structures (data) and behaviors (instructions) for processing, leaving behind extraneous design information. In this respect, distilling may replace the compiling function typically employed in prior art systems.

II. Example Network Configuration

Figure 1:
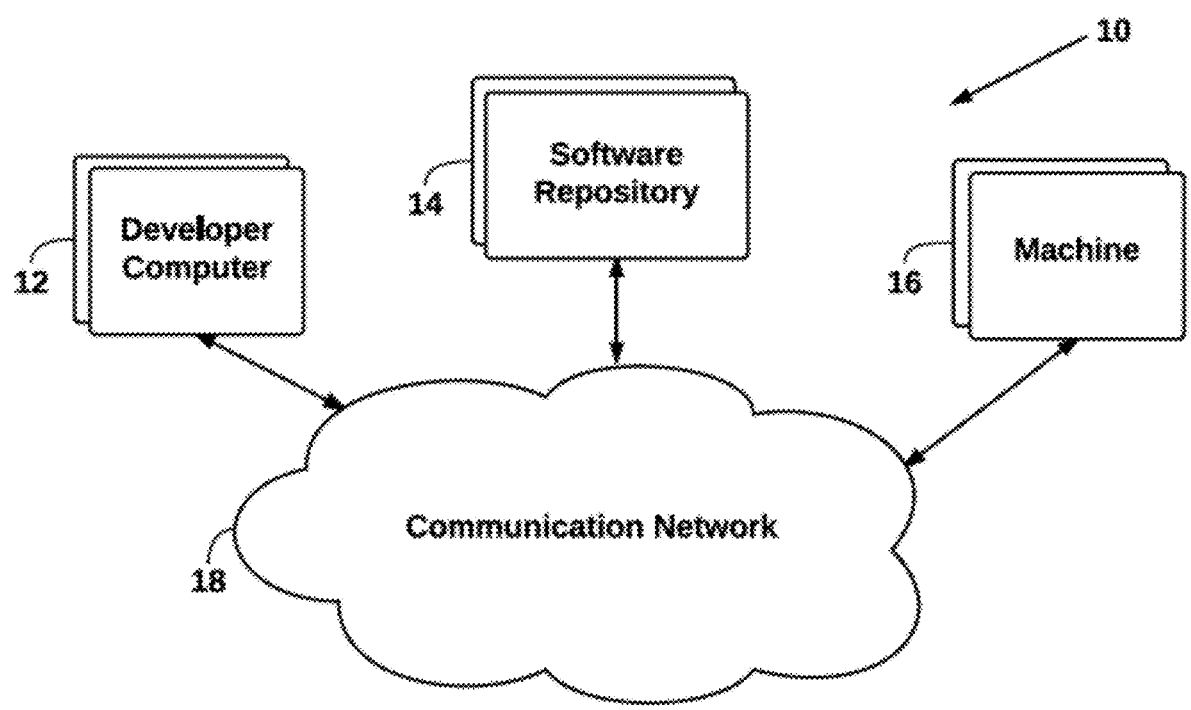
FIG. 1 is simplified block diagram of an example network configuration in which features of the present disclosure can be implemented.

FIG. 1 is a simplified block diagram of an example network configuration 10 in which features of the present disclosure can be implemented. As shown in FIG. 1, the example network configuration may include one or more developer computers 12, one or more software repositories 14, and one or more machines 16, all interconnected via a communication network 18. Although not shown, the example network configuration may include various other networks, systems, devices, etc. as well, including intermediate networks and/or devices that sit between the entities 12, 14, 16 and the communication network 18.

Each of the developer computers 12 may take the form of any one or more computing devices that enable a developer to run an IDE (or the like) and interact with the one or more software repositories 14 via the communication network 18. For instance, a given developer's computer 12 may take the form of at least one client device, examples of which may include a desktop computer, a laptop, a netbook, a tablet, a smart phone, a personal digital assistant (PDA), etc. Regardless of the specific form, this client device may include hardware components (e.g., a user interface, a communication interface, a processor, data storage, etc.) and software components (e.g., software applications and/or other program logic/data) that enable the client device to carry out features of the present disclosure. A developer computer 12 may take other forms as well.

Each of the software repositories 14 may take the form of any one or more devices that are configured to manage software components and interact with the developer computers 12 and the machines 16 via the communication network 18. For instance, a given software repository 14 may take the form of one or more servers (or the like) having hardware components (e.g., a communication interface, a processor, data storage, etc.) and software components (e.g., program logic/data) that enable the server(s) to carry out features of the present disclosure. A software repository 14 may include other devices and/or take other forms as well.

In accordance with the present disclosure, there may also be different types of software repositories 14. One example of a repository type is an entity software repository, which may refer to a repository that is owned and controlled by a single entity. This entity software repository may be used to store and maintain the entity's components. Another example of a repository type is a community software repository, which refers to a repository that is owned and controlled by multiple entities that may be referred to as community members. This community software repository may be used to store and maintain the community's components, and may employ embedded logic to enforce certain community rules (e.g. a member's right to author or revise components based on their status as partner, affiliate, subscriber, trial basis, or the like). Yet another example of a repository type is a domain software repository, which refers to a repository that maintains a configuration for an entity's machines and routes information exchanges from other domains to the appropriate device or thing. Other types of software repositories may also exist.

Each of the machines 16 may take the form of any device or thing (e.g., a sensor) that is capable of obtaining software from the software repositories 14 via the communication network 18 and then executing such software. As such, each machine 16 may include at least a communication interface, a processor, data storage, and program logic/data that enables the machine to carry out the features of the present disclosure. In a preferred implementation, this program logic/data may include an installed VM that is specifically configured to interact with the software repositories 14 (e.g., via a TCP/IP protocol, a mobile protocol, a low-power protocol, etc.) and execute the software obtained therefrom. However, a machine 16 may take other forms as well.

The communication network 18 may include one or more computing systems and/or network infrastructure configured to facilitate communication between entities such as the one or more developer computers 12, the one or more software repositories 14, and the one or more machines 16. This communication network 18 may thus take various forms. For instance, the communication network 18 may be or may include one or more Wide-Area Networks (WANs) and/or Local-Area Networks (LANs), which may be wired and/or wireless. In some examples, the communication network 18 may include one or more cellular networks and/or the Internet, among other networks. The communication network 18 may also operate according to various communication protocols. Although the communication network 18 is shown as a single network, it should be understood that the communication network 18 may include multiple, distinct networks that are themselves communicatively linked. The communication network 18 could take other forms as well.

Although not shown, FIG. 1 may include also other networks, systems, devices, etc. that help to facilitate the features of the present disclosure.

For example, the example network configuration 10 could also include a Domain Name System (DNS), which is a hierarchical, distributed naming system for any resource connected to a private network or the Internet. A DNS may generally translate domain names into numerical IP addresses, and the example network configuration may use such a DNS to provide a base address for Cubicon domains, each of which may operate like an entity's virtual private network (VPN). In practice, an entity may be legally and financially responsible for their domain's interactions/transactions with machines in the network configuration.

As another example, the example network configuration 10 could include a Context Registry, which may manage a base record for each entity. Such a base record could include a DNS address (which may be assigned by a domain name provider), an entity identifier (which may be assigned by Cubicon), and a certificate that authenticates the entity's identity (which may be certified by an identity provider). Additionally, the Context Registry may consolidate metadata of publicly available components to support push and pull discovery models, while keeping metadata exposure to a minimum to protect an entity's intellectual property rights.

III. Systems Language

Disclosed herein is a new systems language built upon components that are configured to provide both a binary representation and a visual expression of software. These components may be created based on predefined component types (i.e., component templates), interconnected into schema, and packaged into contexts and apps that may then be distilled for processing in a machine's VM.

A. Components

In accordance with the present disclosure, a component may be comprised of a set of one or more metaobjects that provides a binary representation of the component. For example, a given component may be represented as a single metaobject. As another example, a given component may be represented as a set of two or more metaobjects that are linked together, where one of the metaobjects is considered the component's "primary" metaobject and the one or more other metaobjects are considered the component's "secondary" (or "nested") metaobjects. The one or more metaobjects for a given component may take other forms as well.

In the disclosed systems language, a metaobject may generally be considered the "DNA" of software, as may hold the "code" (data) that dictates the structure and function of a software artifact. These metaobjects may take various forms.

According to a preferred implementation, a component's metaobject may be comprised of a set of slots that define the meaning of the component. These slots may take various forms. As one example, a component's metaobject may include one or more "attribute" slots that are each configured to hold an attribute of the component. As another example, a component's metaobject may include one or more "object link" slots that are each configured to hold a link to a "secondary" or "nested" metaobject (e.g., for purposes of message passing), in which case the component may be said to have a "nested" component. As yet another example, a metaobject may include one or more "method" slots that each configured to define a behavior of the component. For instance, a component's metaobject may include a "method" slot that defines a method for checking the semantics of the component, thereby allowing the rules of the systems language to be encoded right into the component. Other examples of slots are possible as well.

In accordance with the present disclosure, a given component may then be visually expressed in the form of an icon and a set of one or more underlying panes, where one pane is considered a "primary" pane and any other pane is considered a "secondary" (or "nested") pane. In general, the visual expression of a given component may present certain aspects of the given component's data (which is defined by the component's set of one or more metaobjects) in human-readable form and may also enable human interaction with the component. This visual expression may take various forms.

Figure 2:
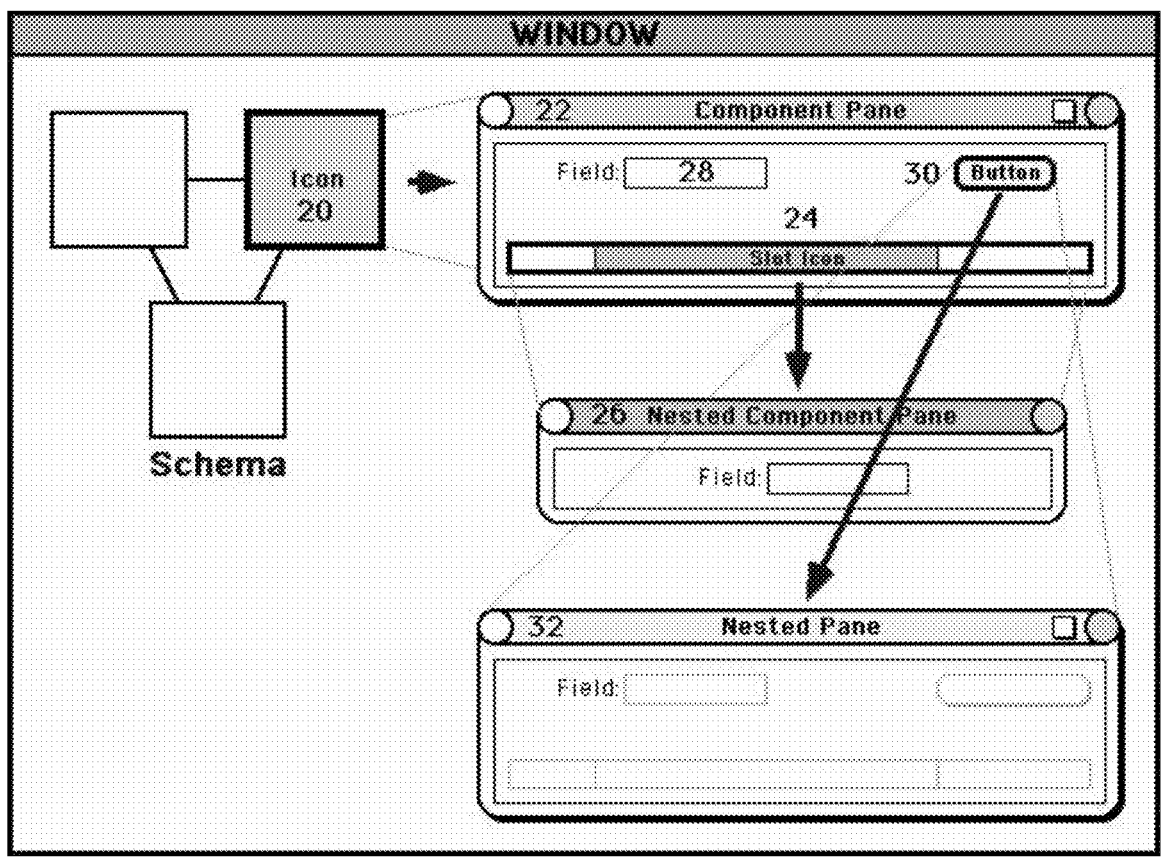
FIG. 2 provides an illustration of example aspects of a given component's visual expression.

FIG. 2 provides an illustration of example aspects of a given component's visual expression. As shown, the given component may be visually expressed at a high level by an icon 20, which may provide a subset of high-level information (i.e., a "snapshot") about the given component. For example, the form of the icon 20 (e.g., the shape, color, etc.) may be indicative of certain information about the given component (e.g., the type of component and/or its function). As another example, the icon 20 may include text that is indicative of certain information about the given component (e.g., the component's name and/or attribute fields). The icon 20 may provide other high-level information about the given component as well.

A given component's icon may then open up into a set of one or more underlying panes, which may visually express aspects of the given component's data and may also enable a user to interact with and modify the given component. For example, FIG. 2 shows the icon 20 opening up into a primary pane 22 and a nested pane 32.

The one or more underlying panes may then provide the visual expression (and allow user modification) of the given component's data via various different GUI elements (also referred to as "widgets"). For example, FIG. 2 shows the primary pane 22 as including embedded "slot" icon 24, which may serve as the visual expression of an "object link" slot of the given component's metaobject and may open to reveal a pane 26 for a nested component (which may in turn include GUI elements that may allow user modification of the nested component). As another example, FIG. 2 shows the primary pane 22 as including an "attribute" data field 28, which may provide a visual expression (and allow user modification) of an "attribute" slot of the given component's metaobject. As yet another example, a FIG. 2 shows the primary pane 22 as including a button 30, which may provide a link to the nested pane 32. A pane may include other types of GUI elements as well.

Advantageously, by expressing components in the form of GUI elements that constrain the form and/or content of developer input, the disclosed systems language has the capability to virtually eliminate the potential for syntactic errors and also reduce the potential for certain semantic errors.

Figure 3:
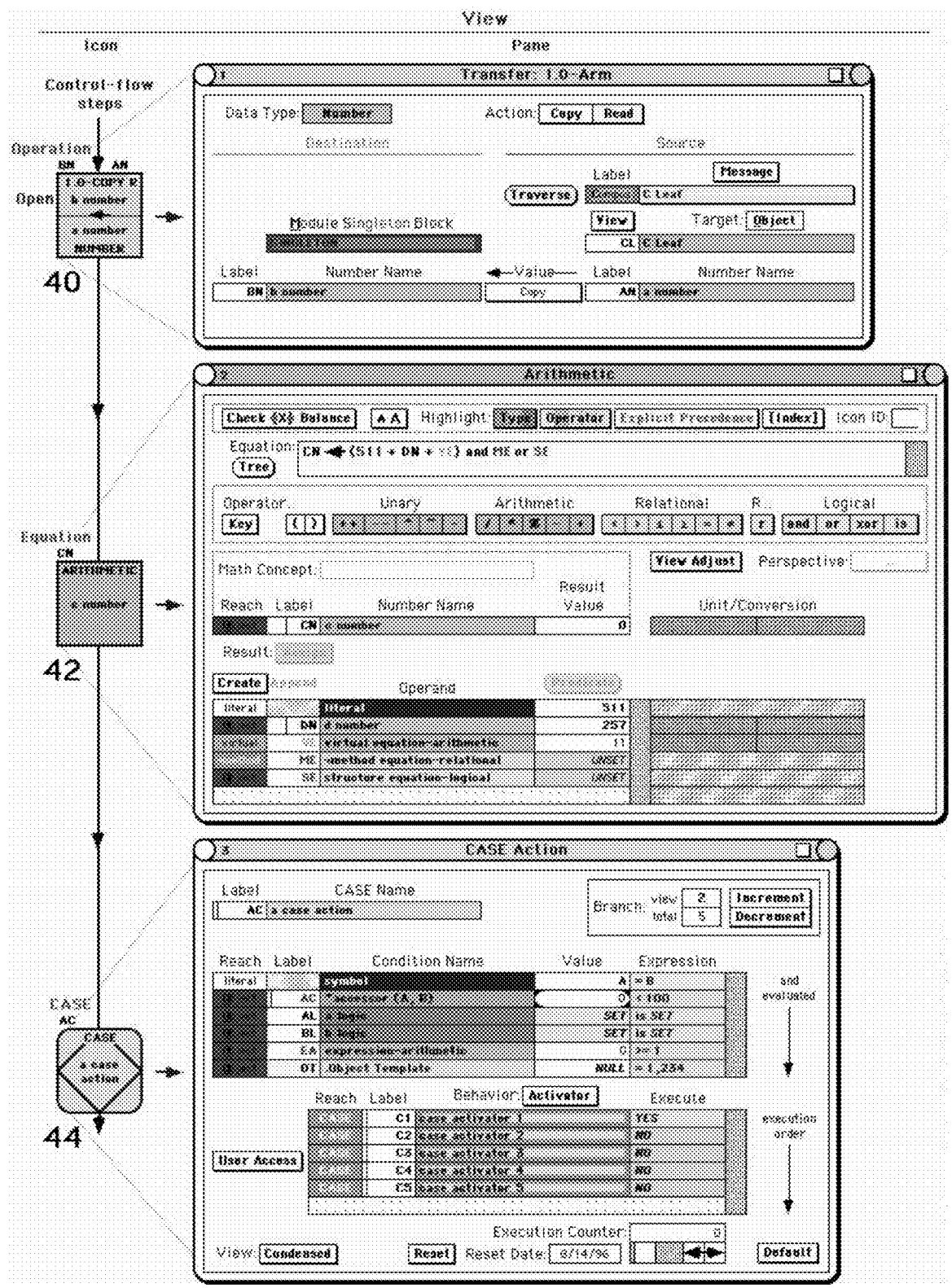
FIG. 3 depicts possible embodiments of primary panes for three example components.

In practice, a pane's GUI may take various forms and/or may have various visual characteristics (e.g., shapes, colors, etc.) that provide further information about the data field and/or its contents. To illustrate this, FIG. 3 depicts possible embodiments of primary panes for three example components: a "Transfer: 1.0-Arm" component (icon 40), an "Arithmetic" component (icon 42), and a "CASE Action" component (icon 44).

As noted above, primary pane for the given component may also include links to one or more other nested panes that drill down to express further aspects of the given component's data. For instance, as noted, the button 30 in the primary pane 22 may link to the nested pane 32. As with the primary pane, this nested pane may include various different GUI elements (e.g., data fields, buttons, etc.) that function to visually express aspects of the given component's data and/or enable a user to interact with and modify the given component.

Figure 4:
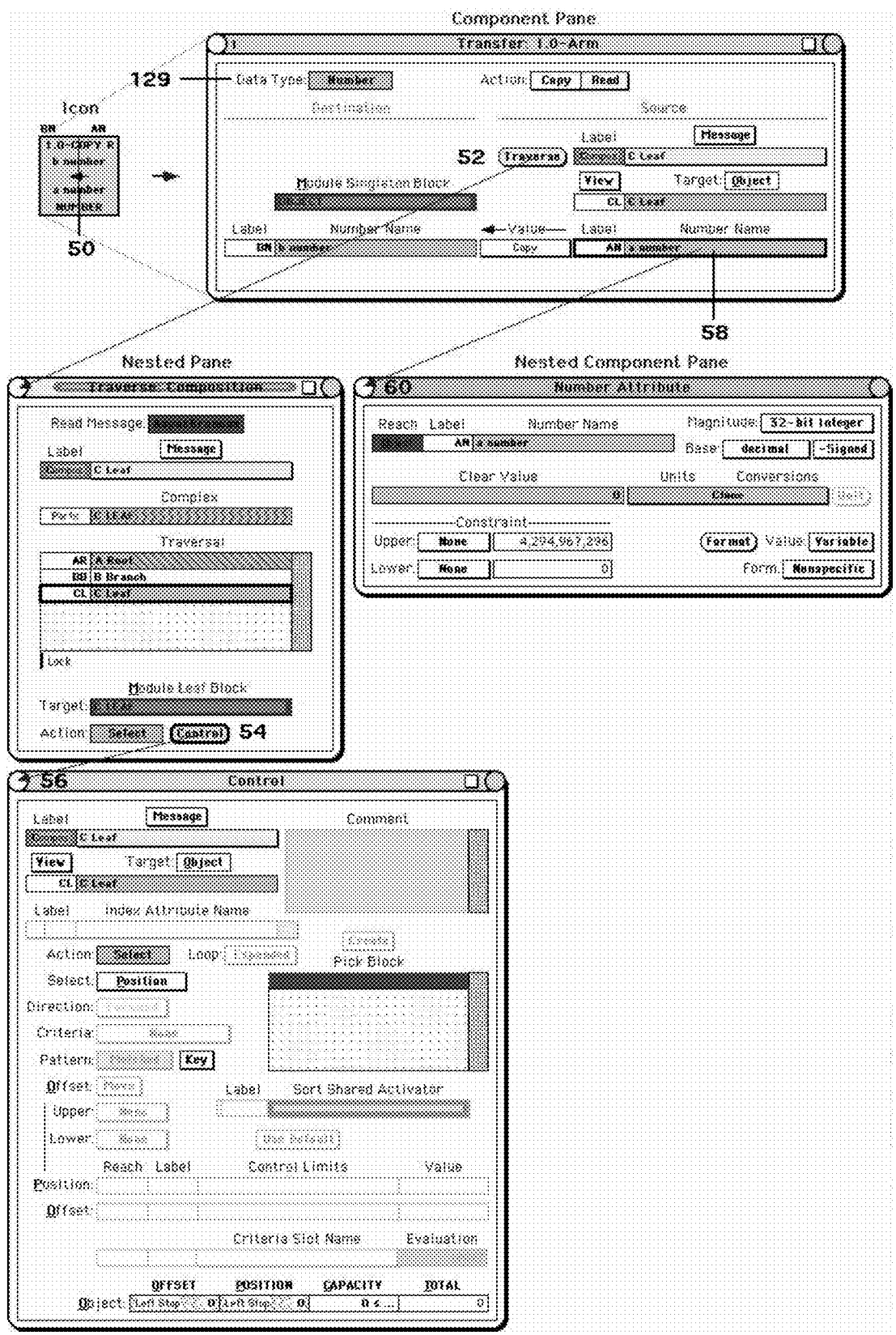
FIG. 4 depicts an example set of linked panes for an example component.

To further illustrate this, FIG. 4 depicts an example set of linked panes for the example "Transfer: 1.0-Arm" component. As shown in FIG. 4, the component's icon 50 may open up into a primary pane 52, which may include a "Traverse" button 52 that opens into a "Traverse" nested pane, which in turn includes a "Control" button 54 that links to a "Control" nested pane 56. Additionally, FIG. 4 also shows the "Transfer: 1.0-Arm" component's primary pane 52 as including a slot icon 58 that lurks to a pane 60 for a nested "Number Attributes" component. Advantageously, these nested panes may be used as a form of information hiding, and may also provide multiple opportunities to embed additional semantics into the language.

Figure 5:
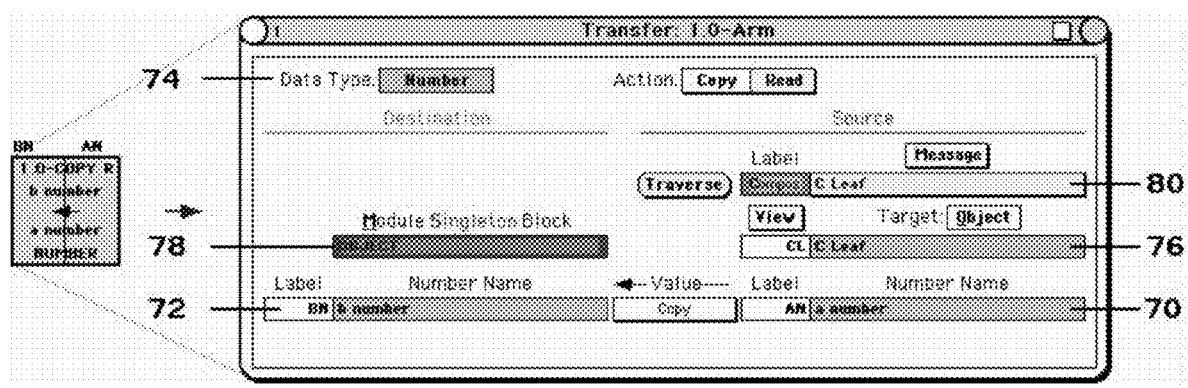
FIGS. 5-7 further illustrate an example visual expression and corresponding binary representation for an example component.
Figure 6:
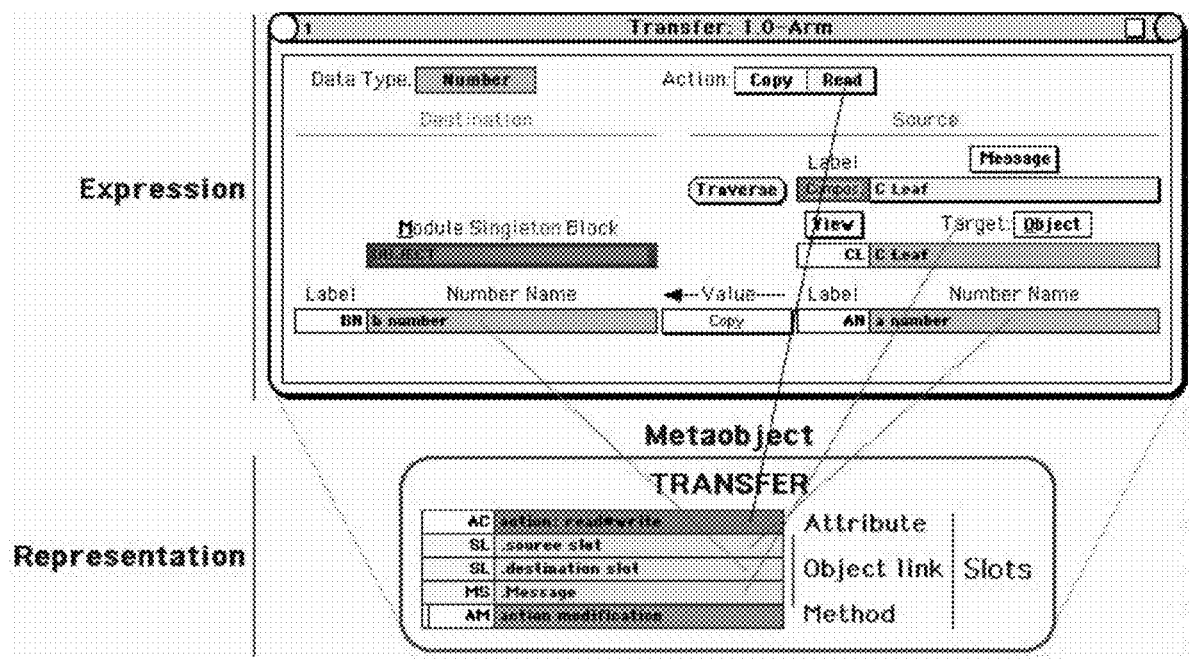
Figure 7:
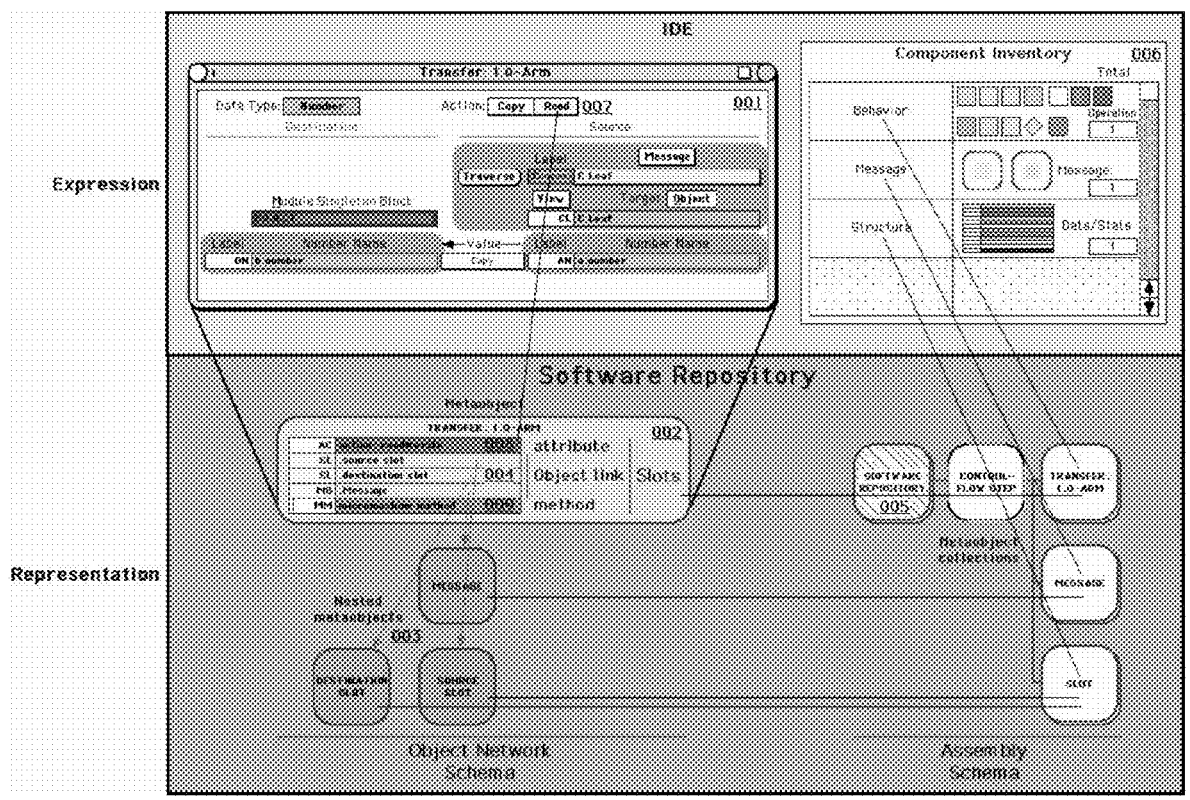

Turning now to FIGS. 5-7, a component's visual expression (i.e., its icon/pane) and corresponding binary representation (i.e., its one or more metaobjects) is further illustrated with reference to the example "Transfer: 1.0-Arm" component, which is generally configured to perform a transfer operation that copies a source value into a destination value.

As shown in FIG. 5, the icon for the "Transfer: 1.0-Arm" component opens up into an underlying primary pane that includes a number of data fields. For instance, FIG. 5 shows the "Transfer: 1.0-Arm" component's primary pane as including a "source" embedded slot icon 70 that visually expresses the "source" nested component from which the value will be retrieved (sourced) and a "destination" embedded slot icon 72 that visually expresses the "destination" nested component that will become the value's destination. Further, FIG. 5 shows the "Transfer: 1.0-Arm" component's primary pane as including a "Data Type" field 74, which generally indicates the "destination" slot's data type using text and color. Further yet, FIG. 5 shows the "Transfer: 1.0-Arm" component's primary pane as including a "Target Object" data field 76 that indicates the object in which the "source" nested component is located and an "Object" data field 78 that indicates the object in which the "destination" nested component is located. Still further, FIG. 5 shows the "Transfer: 1.0-Arm" component's primary pane as including two "Action" fields; the first of which indicates whether the transfer operation is to perform a "copy," "map," "swap," or "assign" action, and the second of which indicates whether the transfer operation is a "read" or "write" action. Then, FIG. 5 shows the "Transfer: 1.0-Arm" component's primary pane as including a "Message" embedded slot icon 80 that visually expresses a nested component that contains a message that will retrieve the value.

FIG. 6 then depicts the mapping between data fields of the example "Transfer: 1.0-Arm" component's primary pane and slots of the component's primary metaobject. For instance, as shown, the "Action" field maps to an "attribute" slot that holds the value of the "Action" attribute. Further, the "destination" and "source" slot icons each map to an "object link" slot, which in turn links to a nested metaobject. Likewise, the "Message" slot icon maps to an "object link" slot that in turn links to a nested "Message" metaobject.

As shown in FIG. 6, the "Transfer: 1.0-Arm" component's primary metaobject may further include a "method" slot, which may contain an "action modification" method that is evoked when the "Transfer: 1.0-Arm" component is modified. According to an example, this method may determine whether a modification violates any semantic constraint. Such constraint checking is performed by fine-grain transactions that may provide real-time feedback to improve a developer's understanding and productivity, and is one basis for the live design process described below.

Turning next to FIG. 7, the full set of metaobjects for the "Transfer: 1.0-Arm" component is depicted. As shown, the "Transfer: 1.0-Arm" component comprises a network of four metaobjects, including the primary "Transfer: 1.0-Arm" metaobject, the nested "Message" metaobject, the nested "Destination slot" metaobject, and the nested "Source slot" metaobject. Further, as shown, instances these linked metaobjects may be stored together within a software. repository.

Figure 8:
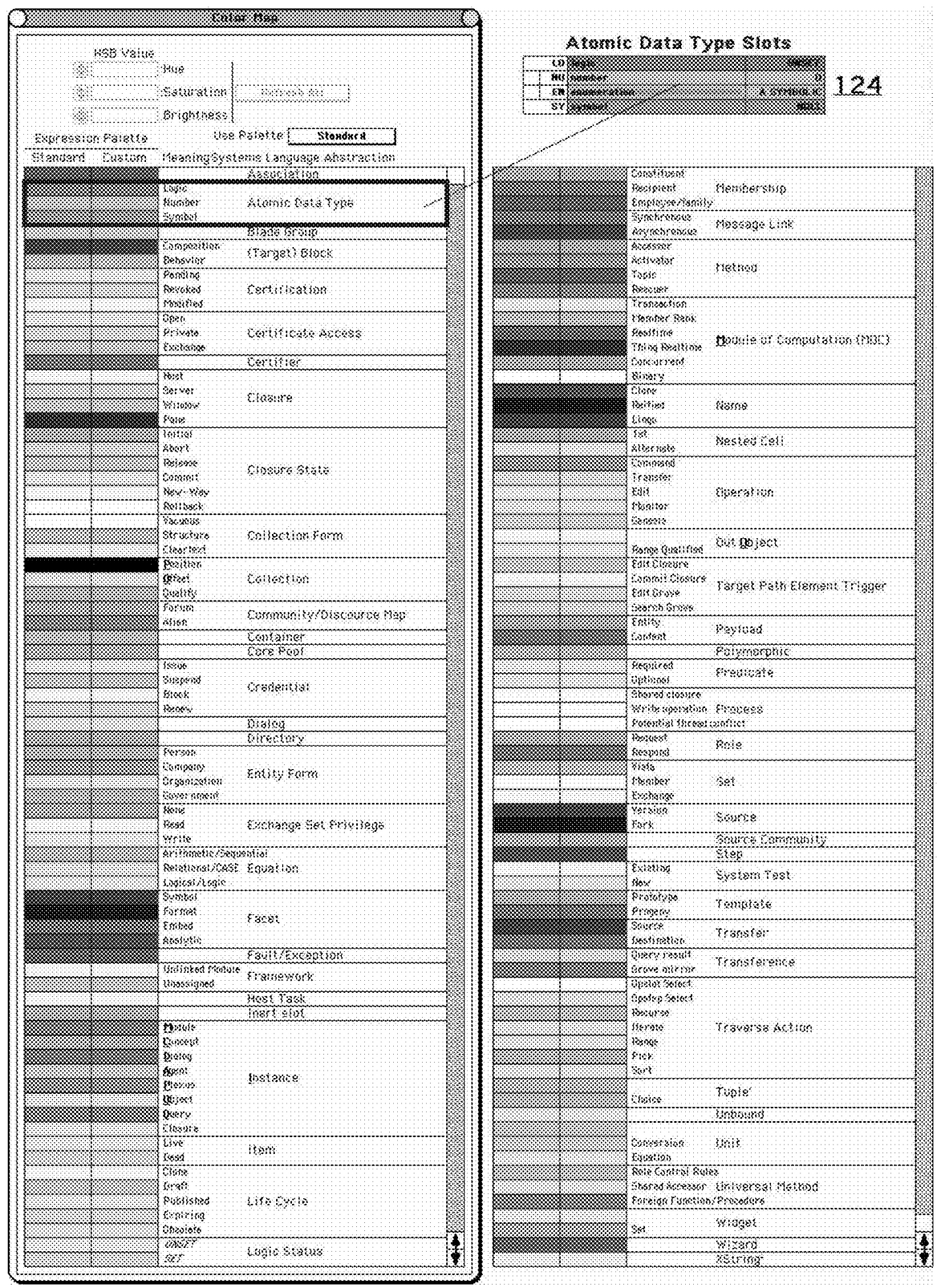
FIG. 8 depicts one possible example of a color scheme that can be used by an integrated design environment in accordance with the present disclosure.

As shown in FIGS. 3-7, various color schemes (palettes) may also be used to visually express aspects of a component. FIG. 8 depicts one possible example of a "standard" color scheme, although many others variations are possible as well. A color scheme may also be customized for various purposes, such as to meet a developer's specific color preferences and/or adjust for color blindness. In practice, the IDE may be configured to automatically default to a developer's palette of choice.

B. Schema

In accordance with the present disclosure, a set of components can be interconnected into a framework known as a schema, which may be used to depict one aspect of a particular type of context (e.g., software program). In practice, a developer may create such a schema by interconnecting component icons together in the IDE. For example, referring back to FIG. 2, a schema of three interconnected icons is shown.

According to one implementation, schemas may break down into two generic categories: behavior and structure. There may be four different types of behavior schema: control-flow, process-flow, data-flow, and finite state machine (FSM). Of these types, control-flow may be considered the core schema type, as it provides the imperative logic to drive the other three types.

Method, operation, equation, glyph, command, state and exception step icons may be used to express the equivalent of a programming statement in prior art imperative programming languages.

Figure 9:
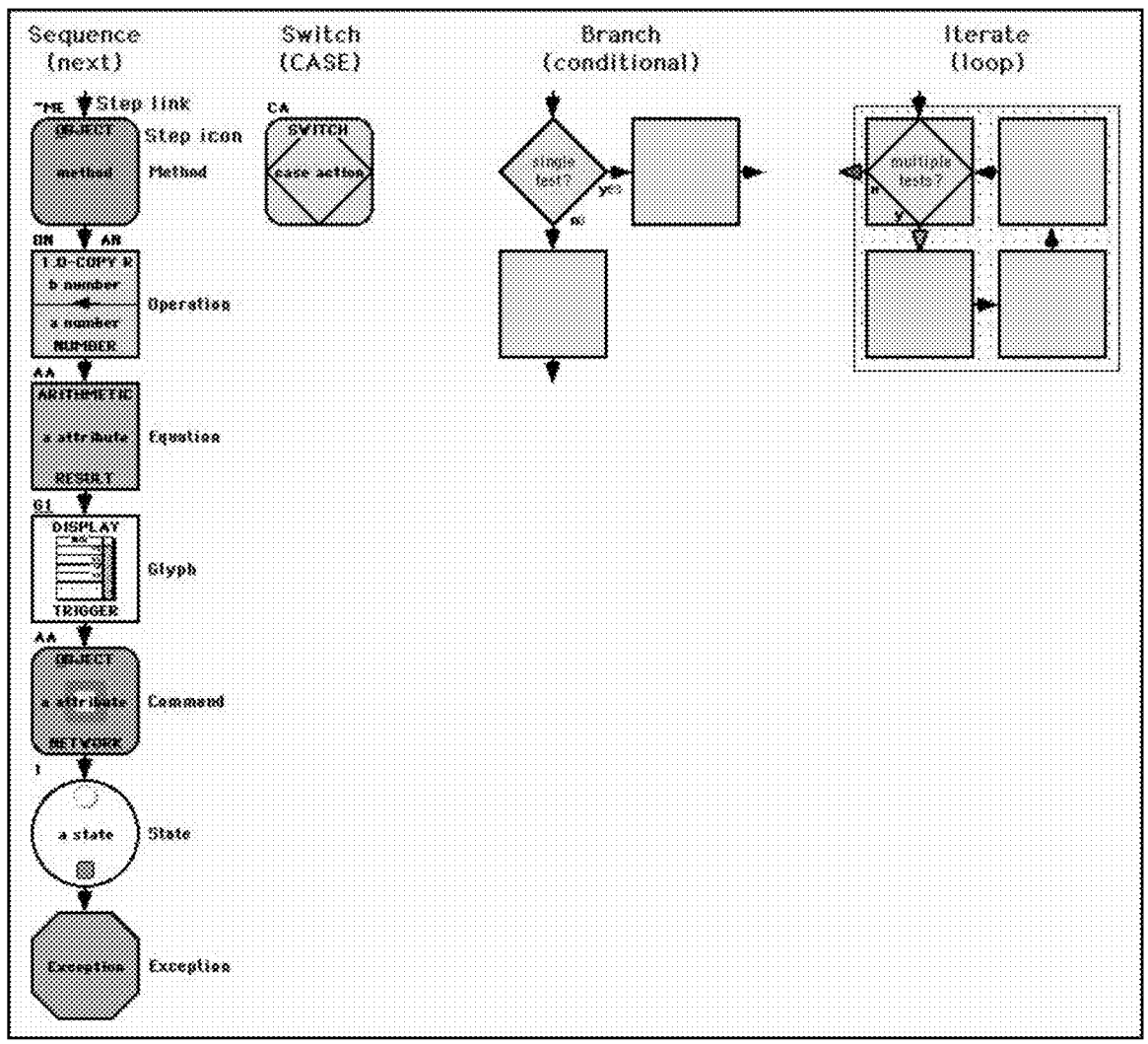
FIG. 9 illustrates examples of constructs for interconnecting components into a schema.

Components may be interconnected using various different constructs, examples of which include Sequence, Switch, Branch and Iterate, which may effectively be seen as the equivalent of control constructs in prior art programming languages. These example constructs are illustrated in FIG. 9. A Sequence construct may be comprised of two or more interconnected step icons in a single thread of control. A Switch construct may be a step icon that tests attribute values for multi-way branching. A Branch construct may be a step icon that changes the flow of control. An Iterate construct may be a loop of interconnected icons that start and end with the same step icon.

C. Component Packaging

As noted above, in accordance with the present disclosure, components may be linked together in various manners. For example, a component may include one or more "object link" slots that each provides a link to nested component. As another example, two or more components may be interconnected via a schema. Other examples for linking components may exist as well.

Using these linking mechanisms, components may be packaged together into higher-level data structures, which may also be referred to as components. For instance, FIG. 10 illustrates one possible way that lower-level (i.e., finer grain) components may be packaged into higher-level (i.e. coarser grain) components in accordance with the disclosed systems language.

Figure 10:
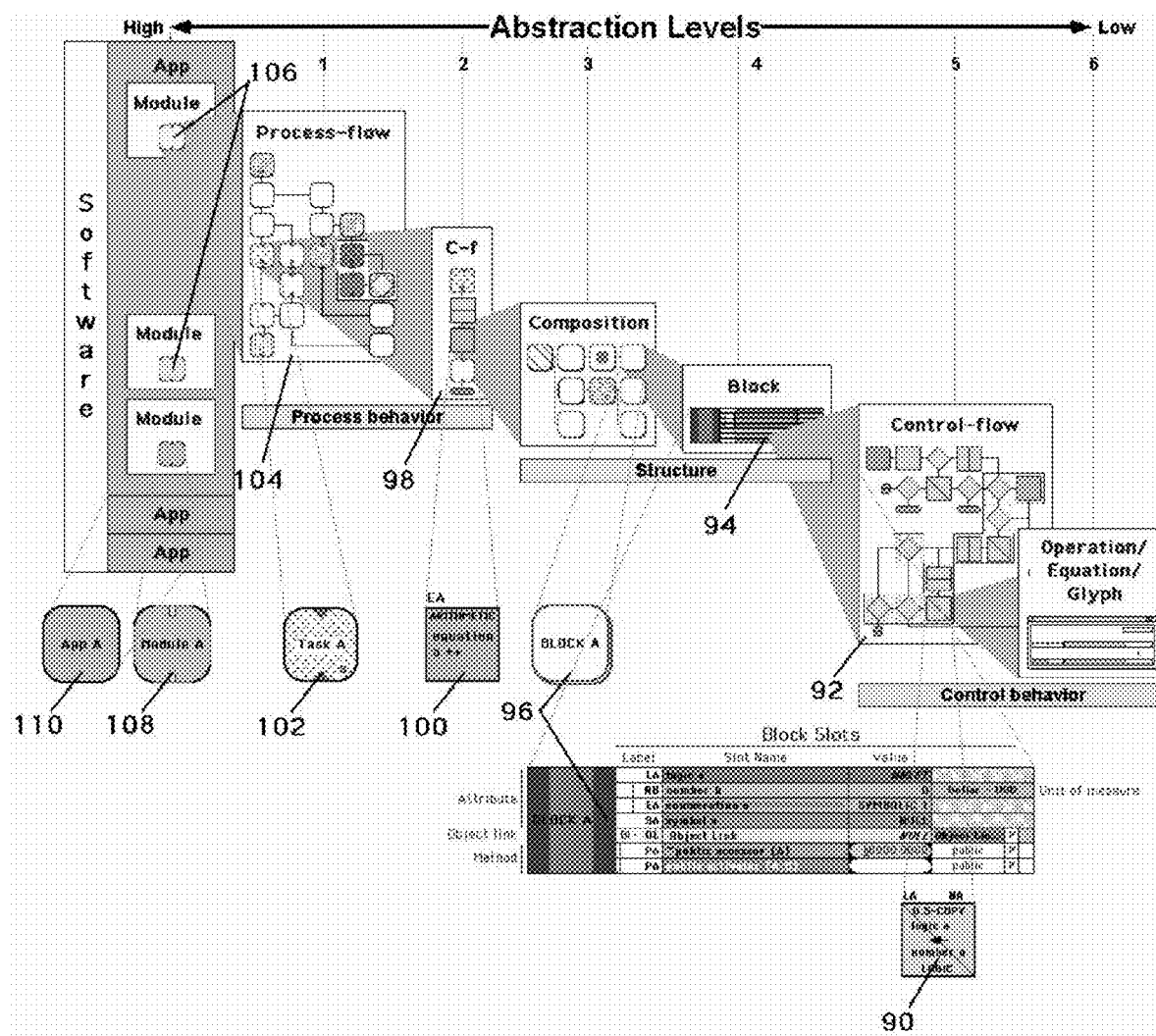
FIG. 10 illustrates one possible way that lower-level components may be packaged into higher-level components in accordance with the disclosed systems language.

As shown in FIG. 10, a given component package may begin with lower-level components types such as operation 90, which may be interconnected into a lower-level "Control-flow" schema 92. In turn, the lower-level "Control-flow" schema is a method 94 that may be expressed as a slot in a "Block" component 96 that may be part of a "Composition" schema. The "Composition" schema may then be included in a higher-level "Control-flow" schema 98 that also includes other lower-level components such as equation component 100. In turn, one or more lower-level "control-flow" schema 98 which may be referred to as a "Task" 102 may be included in a higher-level "Process-flow" schema 104. Next, the Process-flow may be incorporated into a module context 106, which is the largest component type in the systems language and forms an executable piece of software. Finally, two or more module contexts 106 may be packaged together to create an app 110.

In practice, a module context may be thought of as being analogous to a source code module, although a module context is much more robust. Indeed, because a module context incorporates several different abstraction levels, this module context may be developed bottom-up, top-down, or from any abstraction level in between. The ability to express a module from multiple abstraction levels greatly aids in the manipulation of the module's structure or behavior, relying on the "intelligence" of micromachines to assure any action is permissible. As an example, a developer may choose to tweak a single operation within a particular control-flow behavior, or modify the order of execution of tasks within a particular process-flow behavior without compromising the integrity of the module context's overall design.

Figure 11:
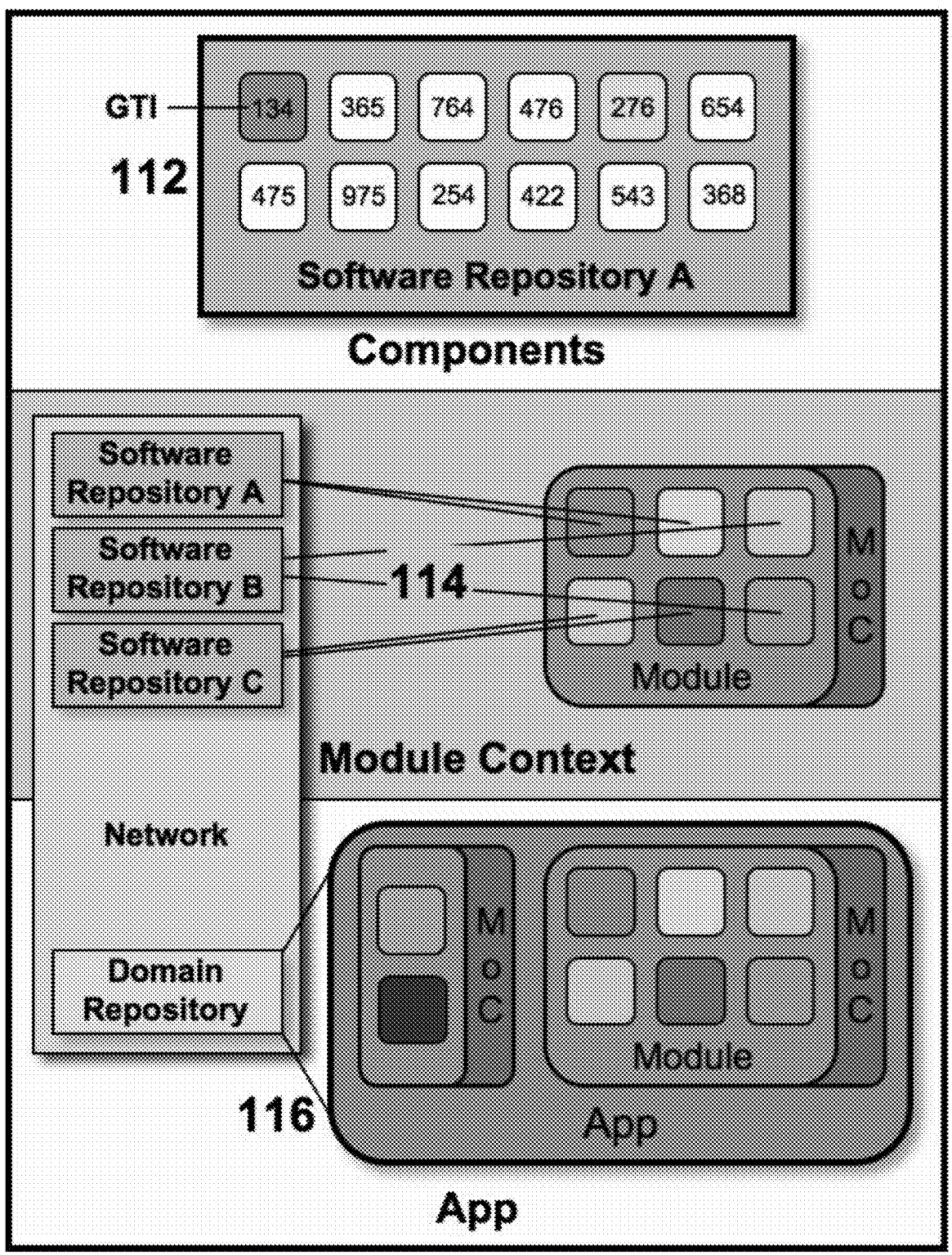
FIG. 11 provides another illustration of packaging in accordance with the disclosed systems language.

FIG. 11 provides another illustration of packaging in accordance with the disclosed systems language. As shown, instances of components from a plurality of software repositories 112 may be packaged together into a context module 114, which may in turn be packed into an app 116 stored in a given software repository (e.g., a domain repository). Further, as shown, the context module may be configured to execute under a given model of computation (MoC), examples of which are discussed in further detail below.

Advantageously, a module context may also use the same format in its dynamic and persistent states to potentially alleviate the "impedance mismatch" between memory and storage, which was introduced with the advent of object-relational databases. The object-relational impedance mismatch is a set of conceptual and technical difficulties that are often encountered when a program written in an object-oriented programming language is used by a relational database management system, which requires mapping classes to a relational database schema in a straightforward manner. In the disclosed system, the object-relational database may be replaced with a composition-network model comprised of three schemas whose structures are represented the same in both dynamic and persistent memory.

D. Templates

In accordance with the present disclosure, the systems language may define templates for various predefined component types from which instances of components nay be created. These predefined component types may take the form of lower-level components (e.g., an individual component) or higher-level components (e.g., a plurality of components packaged into a context module).

Figure 12:
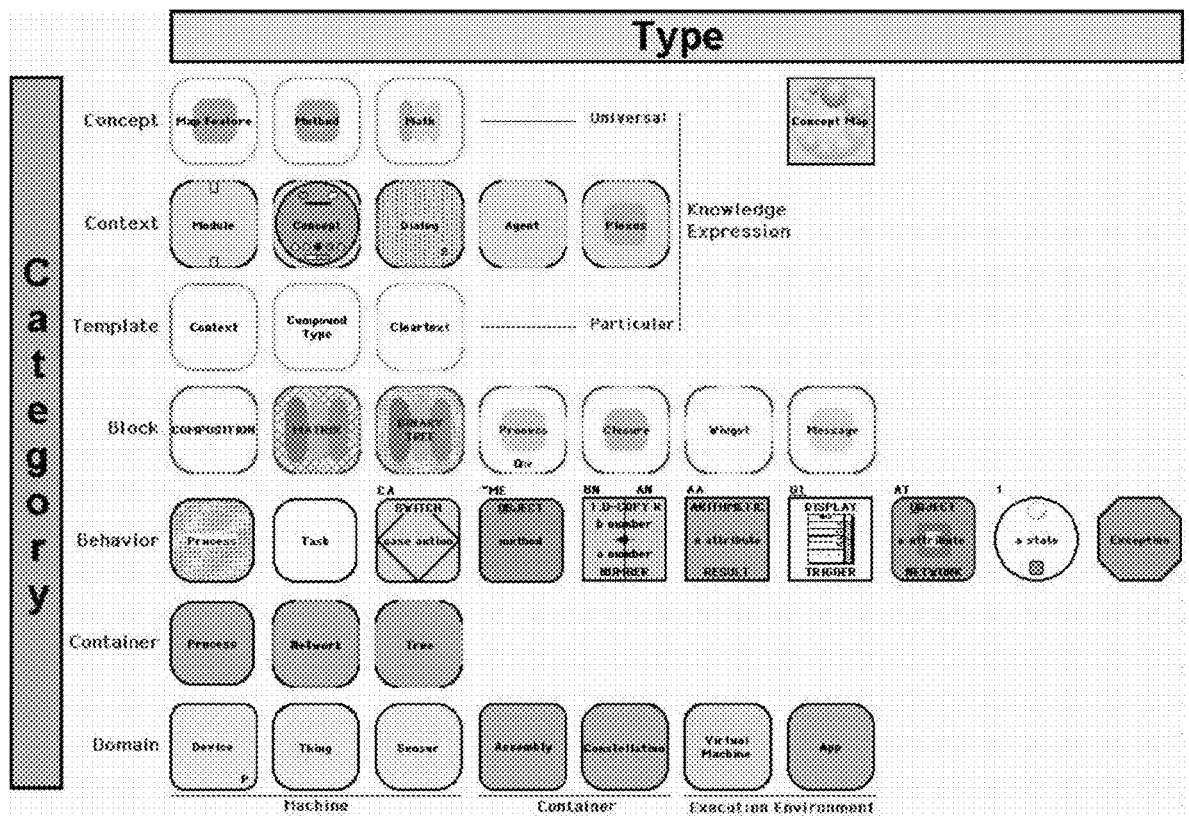
Figure 13:
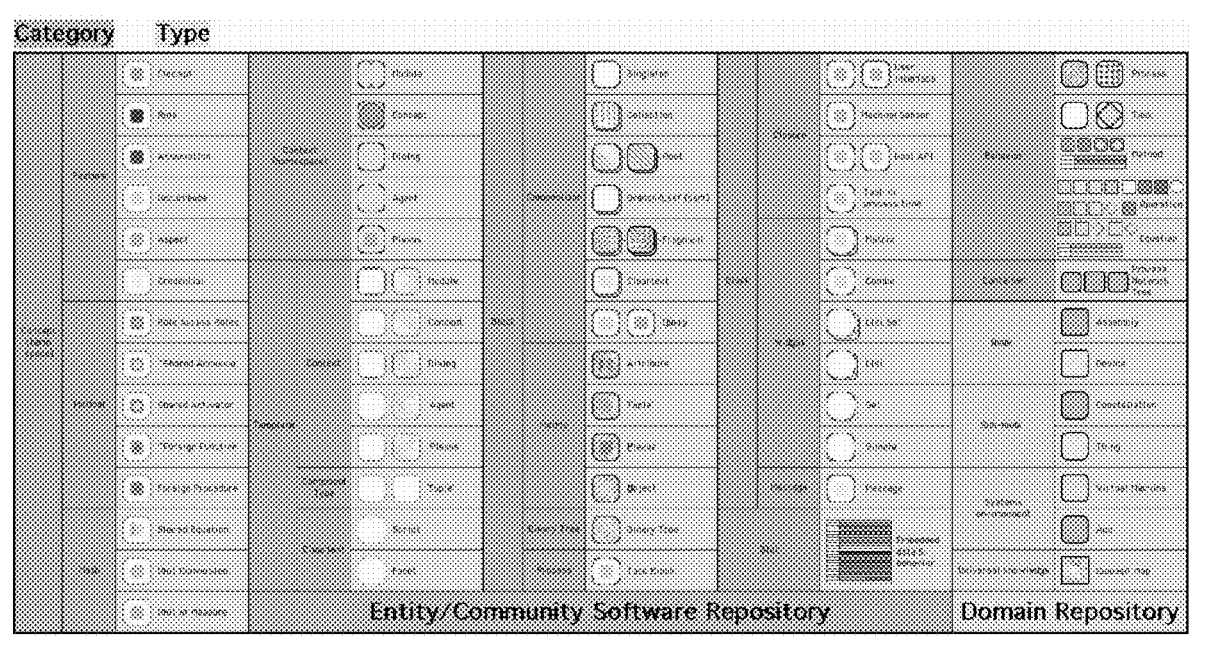

FIGS. 12-13 depict different categories of component types that may be predefined and used in one example implementation. These component categories may be considered the "periodic table of software," as components express and represent the basic building blocks of the digital world in much the same way elements represent the basic building blocks of the natural world.

In general, predefined component types may be categorized based on their functionality. These component categories may take various forms.

A first example of a component category may take the form of a "Concept" category, which includes component types that may be used to depict features in a "concept map." A concept map may conveys universal knowledge about resources through a superimposed layer, or map, of the resources. It captures the concepts that resources exhibit, and the associations between concepts.

A second example of a component category may take the form of a "Context" category, which includes component types such as module contexts that may be used to package nested components as a piece of executable software. A particular instance of a module context that is created from such a template may be referred to as a "grove."

A third example of a component category nay take the form of a "Template" category, which includes component types that a particular developer may be use to create a design pattern of particular instances of components. Component types in this category may be comprised of a plurality of slots within a structure, and may be used during runtime to produce predefined instances of objects and/or records. On general, objects may be the distilled form of metaobjects and may have a unique identifiers that enable direct heap access to a particular object. On the other hand, records have no unique identifiers and are generally used within the context types other than module contexts, such as concept, dialog, agent and plexus, which may only be accessed by traversing a composition, starting with its root collection and traversing up the tree through its branch and leaf collections that contain records.)

A fourth example of a component category may take the form of a "Block" category, which includes component types that may be used to express complex data structures, such as a composition, a matrix, a binary tree, a closure, or a widget.

A fifth example of a component category may take the form of a "Structure" category, which includes component types that may be used to hold values and reference objects. Structure is typically comprised of attribute and/or object link data slots.

A sixth example of a component category may take the form of a "Behavior" category, which includes component types that may be used to read or write values to a data slot.

A seventh example of a component category may take the form of a "Container" category, which includes component types that may be used to organize components within a particular schema.

An eighth example of a component category may take the form of a "Domain" category, which includes component types that may be used to virtually express hardware and software assets.

Other examples of component categories may exist as well.

In accordance with the present disclosure, the systems language may also define templates for various predefined slot types from which instances of slots may be created. FIG. 14 depicts different categories of slot types that may be predefined and used in one example implementation.

Advantageously, these predefined templates may facilitate a more efficient software development process.

IV. Live Design Process

In accordance with the present disclosure, software components are expressed as graphical elements (icons, panes, etc.) that may be created, modified, and/or deleted using a process called live design. According to one implementation, the live design process may be carried out by an IDE running on a developer's computer that is in communication with a software repository. However, other options may be possible as well.

During live design, each action initiated by the developer via an IDE may be performed as a transaction in a particular software repository. In this way, the IDE may act like a portal to the software repository, where the IDE manipulates copies of the components and the software repository modifies the components themselves.

A developer may request various actions via the IDE, examples of which include creating a component, modifying a component, or deleting a component from a context/app under development. According to the disclosed live design process, a developer's requested action for a given component may then be validated (i.e., deemed permissible/legal) before it is accepted. The system may perform this validation in various manners.

In a preferred implementation, the system may be configured to use a two-step validation process that comprises both "internal semantic analysis" and "external semantic analysis." According to this two-step process, the IDE may initially perform internal semantic analysis to determine whether the developer's requested action is deemed permissible for the given component (e.g., whether a data field's modified value falls within a permissible range), which may be dictated by the rules of the disclosed systems language. In turn, the software repository may perform external semantic analysis to determine whether the developer's requested action is deemed permissible when taking into account the other components in a schema and/or context to which the given component belongs (e.g., components that sit adjacent to the given component), as dictated by the rules of the disclosed systems language.

Other implementations for validating a developer's action may be used as well. For example, the system may be configured to perform external semantic analysis only, in which case the IDE would not validate a developer's modification before sending to the software repository. As another example, the system may be configured to perform internal semantic analysis only, in which case the software repository would not perform a further validation of a developer's modification after receiving it from the IDE. As yet another example, it is possible that the IDE and/or the software repository may perform some form of syntactic analysis. Other implementations are possible as well.

Figure 15:
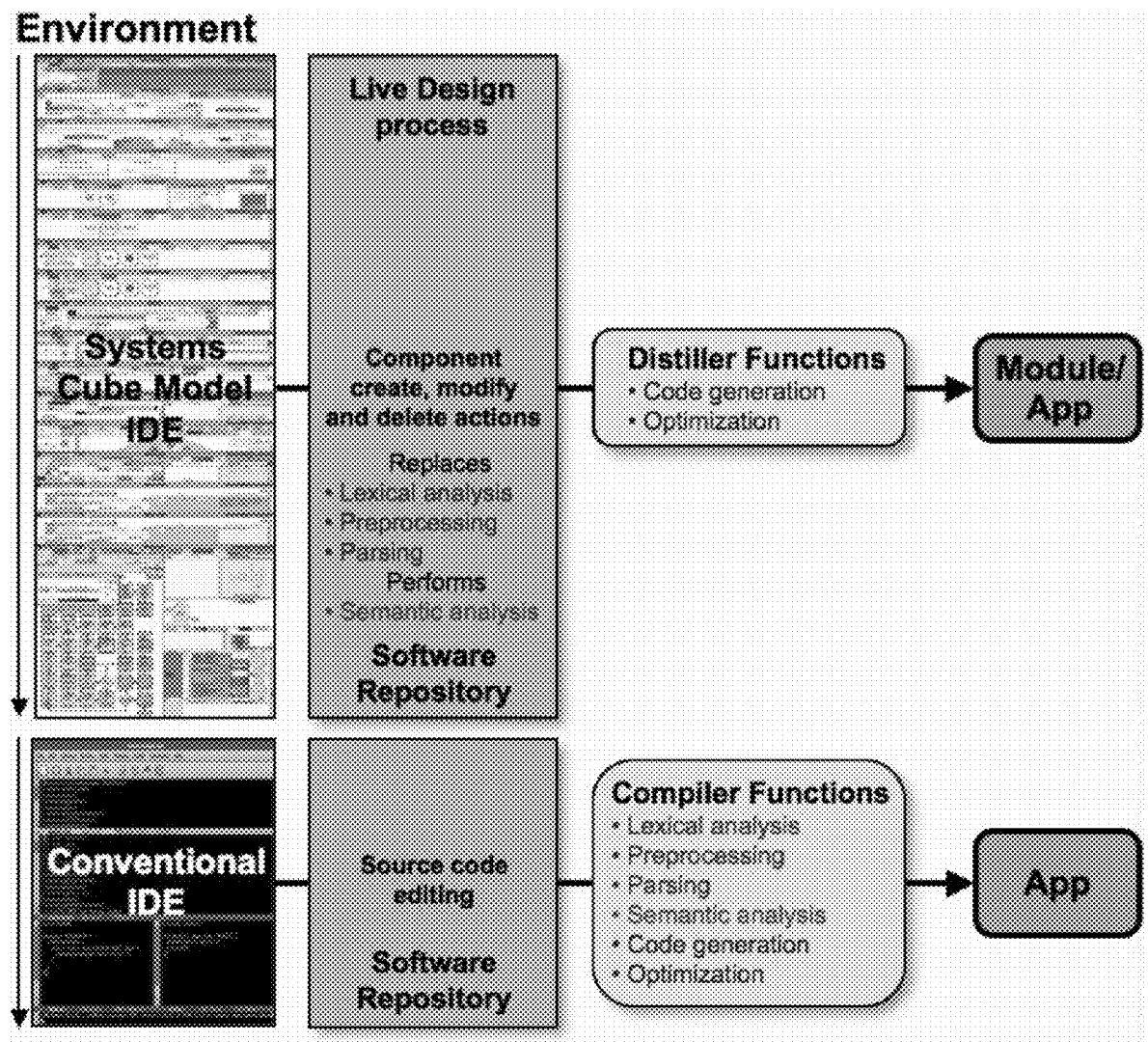
FIG. 15 illustrates a high-level comparison between a live design process and a conventional software development process.

FIG. 15 illustrates a high-level comparison between a live design process and a conventional software development process. As disclosed herein, the live design process may generally enable a developer to perform actions on predefined components that are represented as metaobjects stored in a software repository and are visually expressed as icons and panes in an IDE. During such a live design process, the IDE's panes generally constrain the syntax of components, which may replace the lexical analysis, preprocessing, and parsing functions that are typically need to be performed by a compiler or interpreter during a conventional software development process. Additionally, during a live design process, the IDE and/or the software repository may perform semantic analysis and provide feedback on a transaction-by-transaction basis, which may replace the batched semantic analysis function that a compiler or interpreter typically needs to perform on a source code file during a conventional software development process. It should understood that these distinctions between a live design process and a conventional software development process are merely set forth for purposes of illustration, and that the live design process may differ from (and provide advances over) conventional software development processes in various other manners as well.

Figure 16:
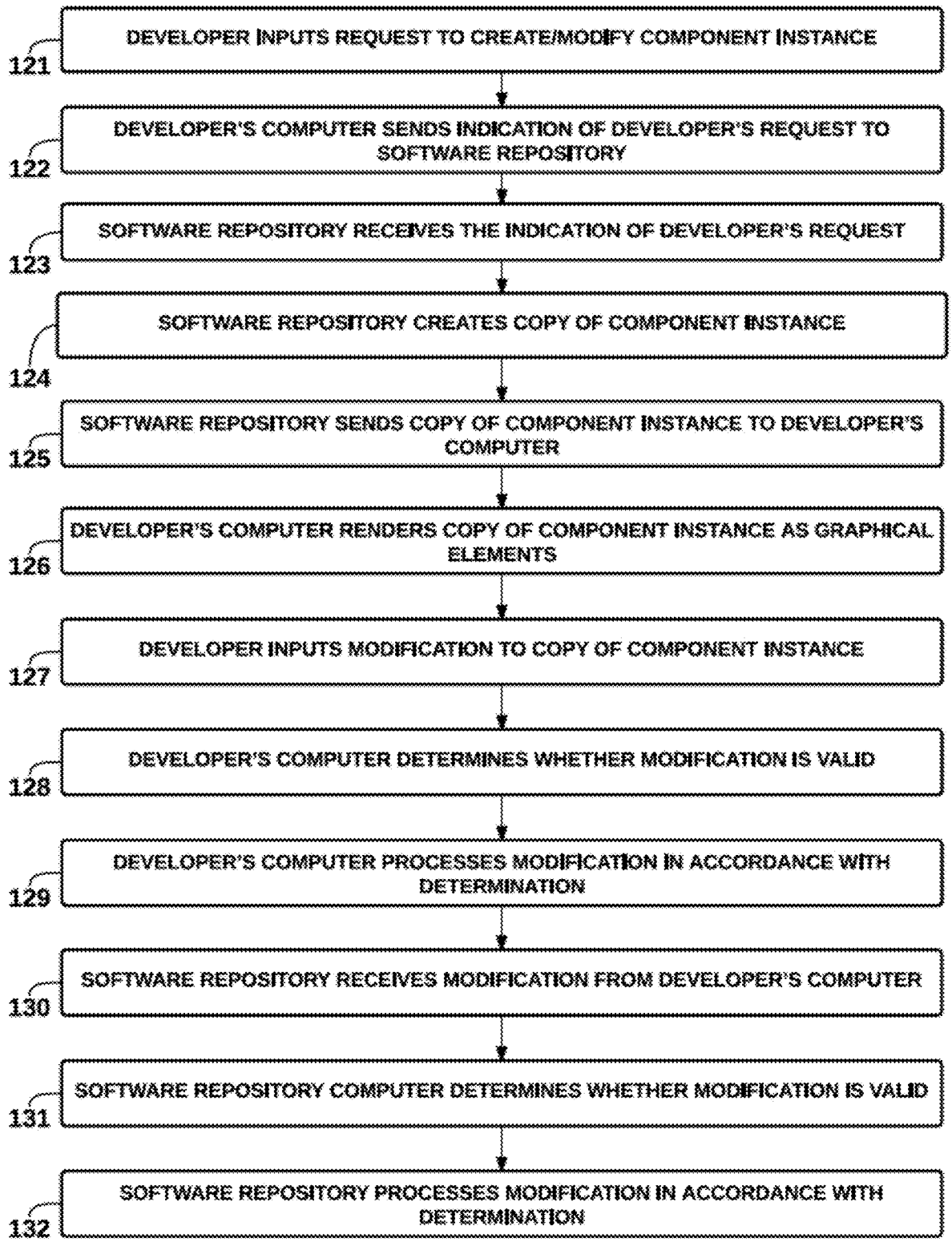
FIG. 16 is a flow chart depicting example functions that be carried out during a live design process in accordance with the present disclosure.

FIG. 16 is next a flow chart depicting example functions that can be carried out during a live design process in accordance with the present disclosure. For purposes of illustration, these functions are described with reference to the example network configuration depicted in FIG. 1, but it should be understood that these functions may be implemented in various other network configurations as well.

As shown in FIG. 16, at block 121, a developer may input, into an IDE running on a developer computer 12, a request to create or modify an instance of a given component that is stored at a software repository 14. For instance, a developer may create a new instance of a given component by making a selection from one or more palettes that may appear in a window of the IDE, where a component palette may be comprised of one or more component types, grouped by function. Alternatively, a developer may select an existing instance of the given component type, which may be part of an existing module context under development. The developer may include the request in other manners as well.

At block 122, the IDE running on the developer computer 12 may send an indication of the developer's request to the software repository 14 via the communication network 18.

At block 123, the software repository 14 may receive the indication of the developer's request. If the developer's request is to create a new instance of the given component, the software repository 14 may generate the new instance of the given component based on a component template stored in the software repository 14. For tracking purposes, the software repository 14 may also assign this new instance of the given component a unique identifier. On the other hand, if the developer's request is to modify an existing instance of the given component, the software repository 14 may then access that existing instance of the given component in the software repository's storage.

At block 124, the software repository 14 may then create a copy of the original instance of the given component for transmission to the developer computer 12. In conjunction with creating this copy, the software repository 14 may also place a lock on the original instance of the given component that is stored at the software repository 14, so that the original instance of the given component cannot be modified until the developer's action is validated.

At block 125, the software repository 14 may then send the copied instance of the given component—which comprises a set of one or more metaobjects—to the developer computer 12 via the communication network 18.

In turn, at block 126, the IDE running on the developer computer 12 may receive the copied instance of the given component and may then render the copied instance of the given component as graphical elements (e.g., an icon and a set of one or more underlying panes) that provide a visual expression of the copied instance of the given component and enable the developer to interact with and modify the given component's one or more metaobjects.

At block 127, the developer may then use the graphical elements rendered by the IDE to input a modification to the copied instance of the given component. As one representative example, the developer may update a value (e.g., a start value) in a predefined data field of a pane and then select a "commit" button. The developer's modification to the copied instance of the given component may take various other forms as well.

At block 128, the IDE running on the developer computer 12 may then determine whether the developer's modification to the copied instance of the given component is valid. For instance, the IDE may make this determination by performing internal semantic analysis to determine whether an attribute's modified value falls within a range deemed permissible for the given component, as dictated by the rules of the disclosed systems language.

In practice, this internal semantic analysis may be carried out by a widget of the IDE. For instance, a widget may execute a method (or series of methods) that determines whether the developer's modification is valid under the rules of the systems language when taking into account the permissible values of the given attribute itself and perhaps also the given attribute's relationship to other attributes. In a preferred implementation, such a method may be configured for a particular component type and may encoded as part the IDE platform (e.g., in a closure and its linked widgets), although other implementations are possible as well. The IDE may also perform the internal semantic analysis in other manners.

At block 129, the IDE running on the developer computer 12 may then process the user modification in accordance with the determination. For instance, if the IDE determines that the user modification is invalid (e.g., because the modified value of an attribute is not permissible), the IDE may reject the user modification and present the developer with a notification of this rejection that may provide some level of feedback, which may range from a simple alert to recommendations for an alternative strategy or strategies.

On the other hand, if the IDE determines that the user modification is valid, the IDE may cause the developer computer 12 to transmit the user modification to the software repository 14 for further processing. For instance, the IDE may cause the developer computer 12 to transmit the user modification to the software repository 14 in the form of a modified version of the copied instance of the given component. However, the IDE may cause the developer computer 12 to transmit the user modification to the software repository 14 in other forms as well (e.g., as a user modification that has not yet been applied to the copied instance of the given component).

At block 130, the software repository 14 may receive the user modification from the developer computer 12. At block 131, depending on the given component, the software repository 14 may then make a separate determination of whether the developer's modification to the copied instance of the given component is valid. For instance, if the given component is a lower-level component that is linked to other components via a schema or the like, the software repository 14 may proceed with this separate determination. On the other hand, if the given component is a higher-level component such as a module context that is not linked to other components, the software repository 14 may forego this separate determination.

If the software repository 14 proceeds with the separate determination, the software repository 14 may make this determination by performing external semantic analysis to determine whether the user modification is deemed permissible when taking into account the other components in a schema and/or context to which the given component belongs (e.g., icons that are interconnected with lines or arrows), as dictated by the rules of the disclosed systems language. In practice, this external semantic analysis may be performed at the software repository by a software "micromachine," which is a term is borrowed from the nanotechnology field that means "a machine or mechanism with parts smaller than a millimeter, as one fabricated using MEMS technology." Such a software micromachine may execute a method (or series of methods) that determines whether the developer's modification is valid under the rules of the systems language when taking into account other component attribute values. In a preferred implementation, such a method may be encoded within the given component itself (e.g., as a "method" slot), although other implementations are possible as well, including the possibility that the method (s) for performing external semantic analysis are maintained in whole or in part at the software repository. One advantage of this mechanism may be that enhancements to the disclosed systems language may be made in isolation as compared to a "monolithic" source code compiler.

At block 132, the software repository 14 may then process the user modification in accordance with the separate determination. For instance, if the software repository 14 determines that the user modification is invalid, the software repository 14 may reject the user modification and transmit a notification of this rejection to the developer computer 12, which may in turn pass the notification to the IDE for display to the developer. As one representative example, this notification may take the form of a popup pane in the IDE that notifies the developer that the modification was not permissible, and potentially also offers an alternative strategy or strategies the developer can take to receive a commit.

On the other hand, if the software repository 14 determines that the user modification is valid, the software repository 14 may update the original instance of the given component based on the user modification (e.g., by replacing the original instance's attribute value with the modified value) and release the lock on that instance of the given component. In other words, the software repository 14 may "commit" the user modification to the original instance of the given component stored at the software repository 14.

The developer may repeat the foregoing steps for any other components that the developed wishes to create and/or modify.

Figure 17:
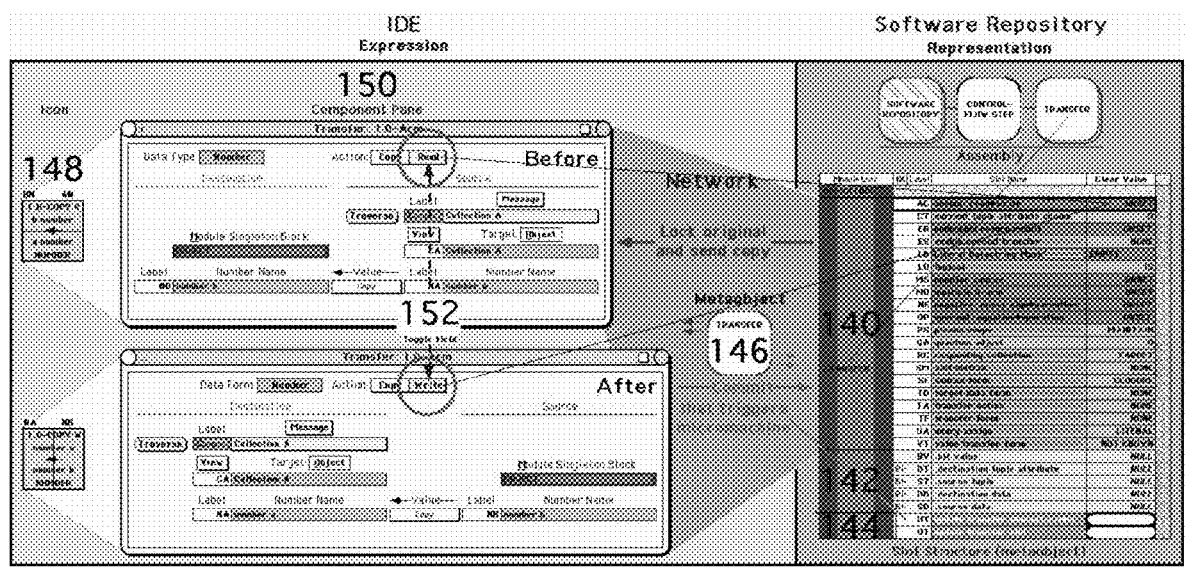
FIG. 17 illustrates an example live design transaction for a given instance of an example component.

A live design transaction for a given instance of the example "Transfer 1:0-Arm" component will now be described with reference to FIG. 17. As shown in FIG. 17, the given instance of the "Transfer 1:0-Arm" component may comprise at least one given metaobject stored in a software repository, which may in turn comprise a set of slots that holds the given metaobject's data. For example, the given metaobject is shown as including a subset of "attribute" slots 140 that hold metaobject's attributes, a subset of "object link" slots 142 that hold the metaobject's object links, and a subset of "method" slots 144 that hold metaobject's methods. In line with the discussion of above, the particular types of slots to be included in a component's set of metaobject slots may be predefined for each predefined component type and may be embodied in the component templates that are used to create instances of components.

In response to a modification request by a given developer's computer, the software repository may then place a lock the original instance of the given metaobject stored in the software repository (so that it cannot be modified by other developers), create a copy 146 of the given metaobject, and send the copy 146 to the given developer's computer. In association with locking the original instance of the given metadata, the software repository may also store an identifier of the entity (e.g., the developer) that made the modification request.

After the given developer's computer receives the copy 146 of the given metaobject, an IDE running on the given developer's computer may the render the copy 146 as an icon 148 and at least one underlying pane 150 that provide a visual expression of this instance of the "Transfer 1:0-Arm" component. This visual expression of the example "Transfer 1:0-Arm" component was described in detail above with reference to FIG. 5.

The developer may then modify various attributes of the given instance of the component via the pane 150. One such attribute may take the form of a read/write action, which defines whether this instance of the "Transfer 1:0-Arm" component will read a remote value into the local object or write a local value into a remote object. As shown, this read/write action attribute may be visually expressed in the pane 150 as a modifiable action field 152, and the developer may modify the read/write action attribute of the copy 146 by toggling the action field 152. For example, FIG. 17 shows the action field in the pane 150 being toggled from a "Read" value to a "Write" value, which may correspondingly toggle the text value in the upper-right-hand corner of the icon (highlighted in yellow) from "R" to "W." This modification entered via the pane 150 may in turn cause the IDE to assess and determine whether the developer's modification is valid (e.g., by performing an internal semantic analysis). If so, the IDE may then modify the value of the read/write action attribute in the copy 146 of the given metaobject.

Once the given developer is done modifying the attributes of the given instance of the component, the given developer may request a "Commit" action, which may cause the given developer's computer to send the modified copy 146 of the given metaobject back to the software repository. In turn, the software repository may further assess and determine whether the given developer's modification to the copy 146 is valid (e.g., by performing an external semantic analysis). For example, the software repository may assess and determine whether the given developer's modification to the read/write action attribute is valid by executing an "update transfer property" method, which is a manifestation of a portion of the micromachine that is configured as a method. If so, the software repository may then update the original instance of the given metaobject based on the modified copy 146 of the given metaobject (e.g., by replacing the original instance with the modified copy 146 and the software repository may also release the lock on the given metaobject.

In accordance with the present disclosure, the live design process may also enable multiple developers to simultaneously work on the same instance of a component stored in a software repository. This feature—which may be referred to as "design time component sharing"—will now be described with reference to FIG. 18, which illustrates three developers (Fred, John, and Sue) working on the same given instance of a "Transfer 1:0-Arm" component stored in a software repository.

Figure 18:
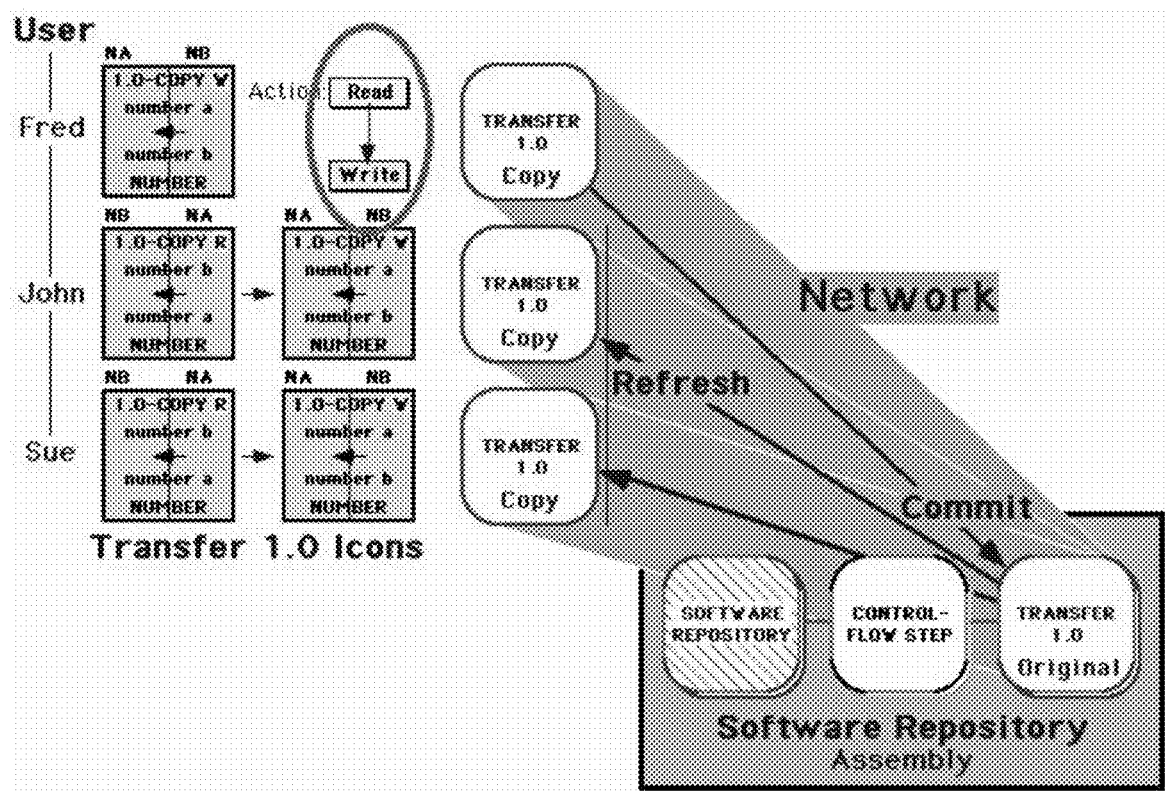
FIG. 18 illustrates an example of "design time component sharing: in accordance with the present disclosure.

As shown in FIG. 18, each developer may be provided with the developer's own respective copy of the at least one metaobject for the given instance of the "Transfer 1:0-Arm" component, which may be stored at the developer's computer and rendered by the developer's IDE to provide a visual expression of the given instance of the "Transfer 1:0-Arm" component. Using these respective copies, the develops may then refine the same given instance of the component in parallel. For example, as shown in FIG. 18, Fred may modify the value of the read/write action attribute in his respective copy of the metaobject and then request a "Commit" action, which may cause Fred's computer to send his modified copy of the metaobject back to the software repository. In turn, the software repository may assess and determine whether Fred's modification to the copy 146 of the metaobject is valid, and if so, the software repository may update the original instance of the metaobject based on Fred's modified copy 146 of the metaobject.

After updating the original instance of the metaobject, the software repository may then "refresh" the other developers' copies of the metaobject by sending each other developer (in this case, John and Sue) a new respective copy of the updated metaobject. Finally, each other developer's IDE may render the developer's new copy of the updated metaobject to provide a visual expression of the updated instance of the "Transfer 1:0-Arm" component, which may reflect Fred's modification of the read/write action attribute. For example, FIG. 18 shows that the text value in the upper-right-hand corner of the icon for John and Sue has changed from "R" to "W."

Figure 19:
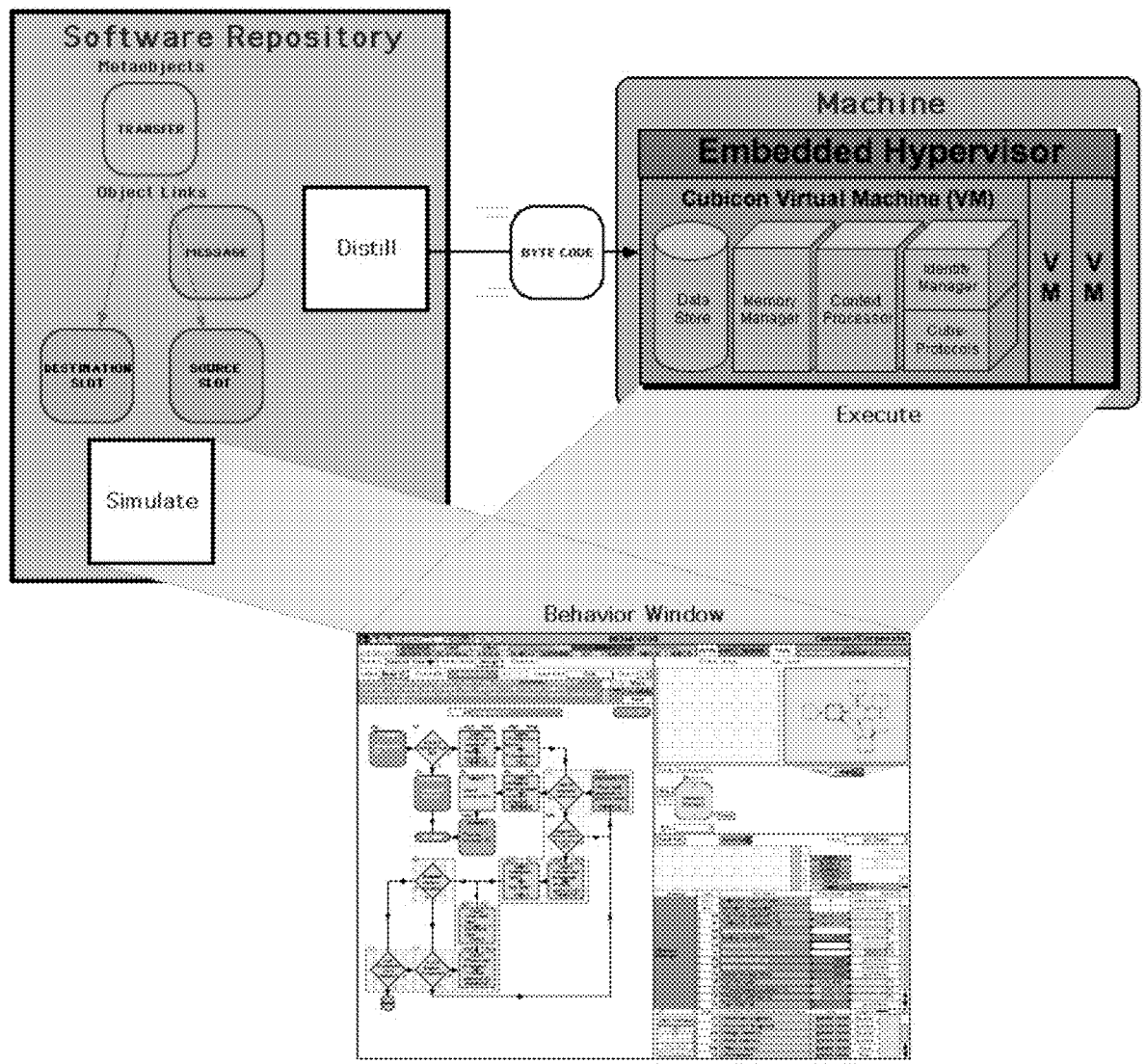
FIG. 19 illustrates a process for simulating, distilling, and executing a software package in accordance with the disclosed systems language.

During development of a module context, a developer may also have the option to perform a "simulation" of the module context, which may provide real-time feedback regarding the module context's behavior that enables the developer to make appropriate adjustments to the developer's design. (It may also be possible for the module context's behavior to be visually monitored during execution, which may assist in the debugging process.) Once a module context is complete, a software repository may then distill the module context for processing by a VM, which may generally transform the behaviors of the module context's metaobjects into "objects" that take the form of optimized byte code. Additionally, the distillation process may also involve "keying" the byte code to download into a particular VM, which may serve to prevent execution by unauthorized third parties. This process is generally illustrated in FIG. 19.

V. Example Integrated Design Environment

Figure 21:
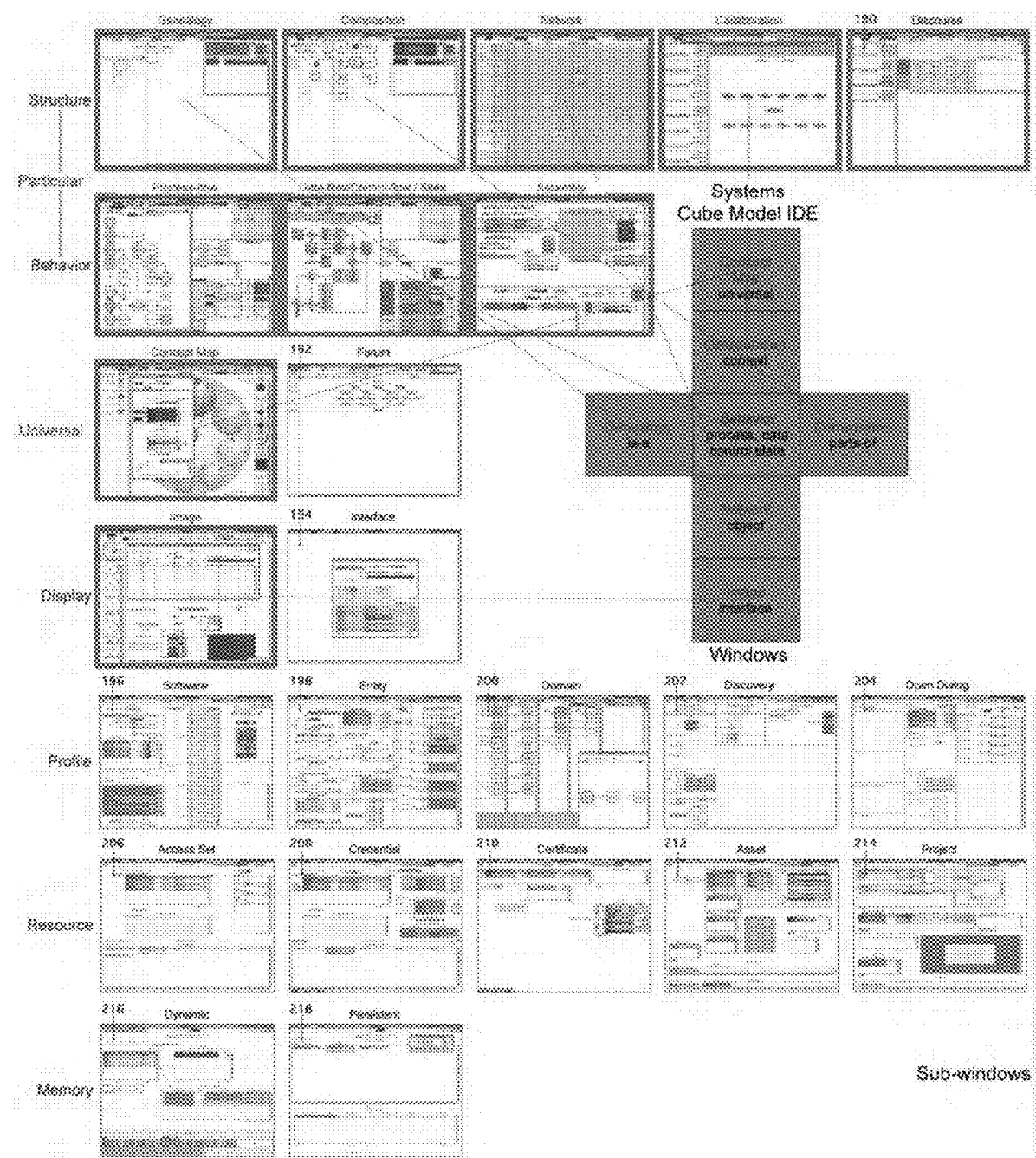
Figure 22:
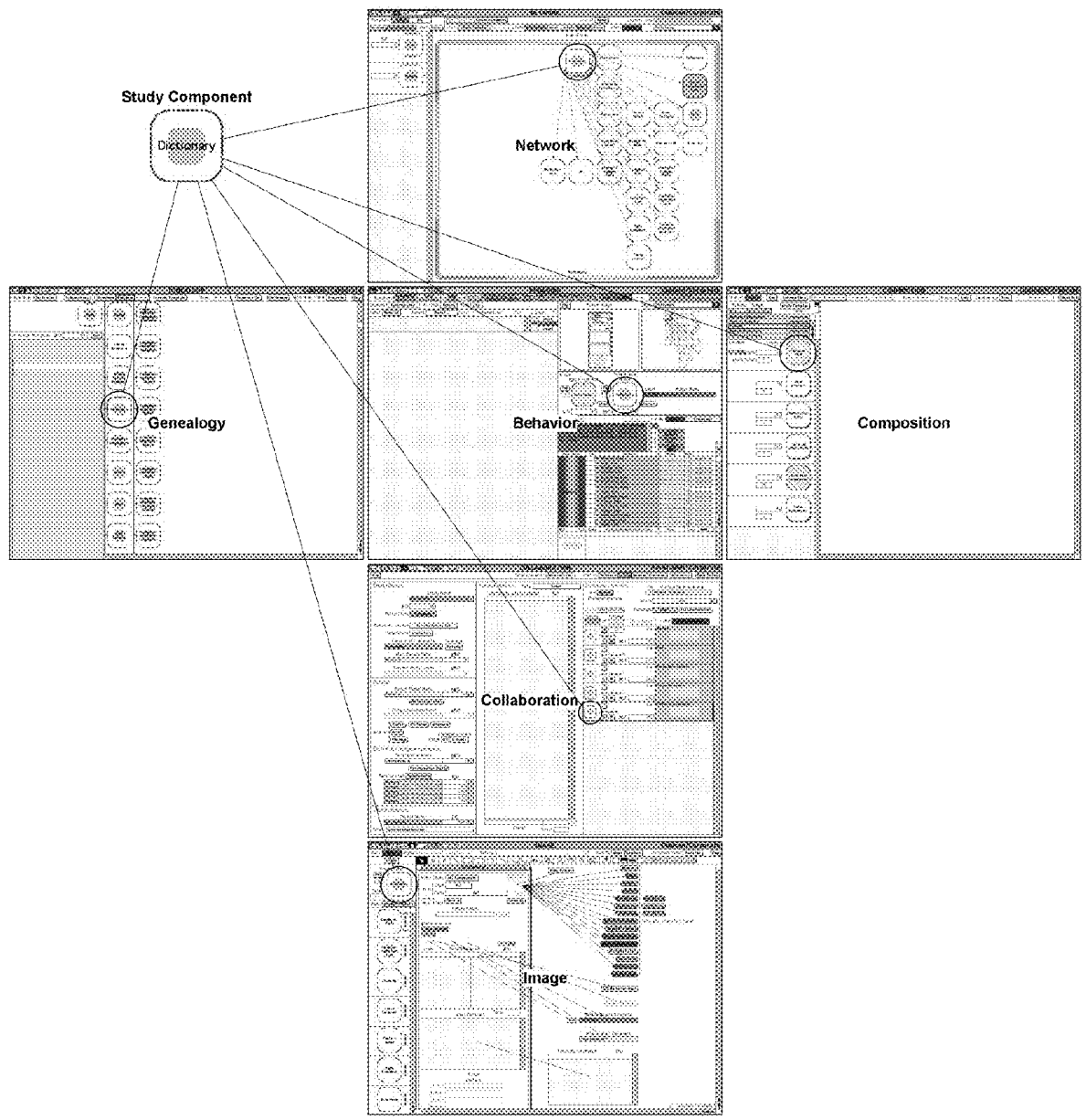

As noted above, one aspect of Cubicon may take the form of an IDE (which may be referred to as the Systems Cube Model IDE) that generally functions to provide the visual expression of the disclosed systems language and facilitate the disclosed live design process. Additionally, the disclosed IDE may also be configured to visualize general systems space from multiple perspectives, by portraying the structure and behavior of a software system in various windows. For instance, one example embodiment of the IDE may include Genealogy, Composition, Network, Collaboration, Concept Map, and Image, and Behavior windows, each of which may be mapped to one or more schemas of the IDE. These example IDE windows are depicted in FIGS. 20-22, described in the following sub-sections.

A. Genealogy Window

Figure 20:
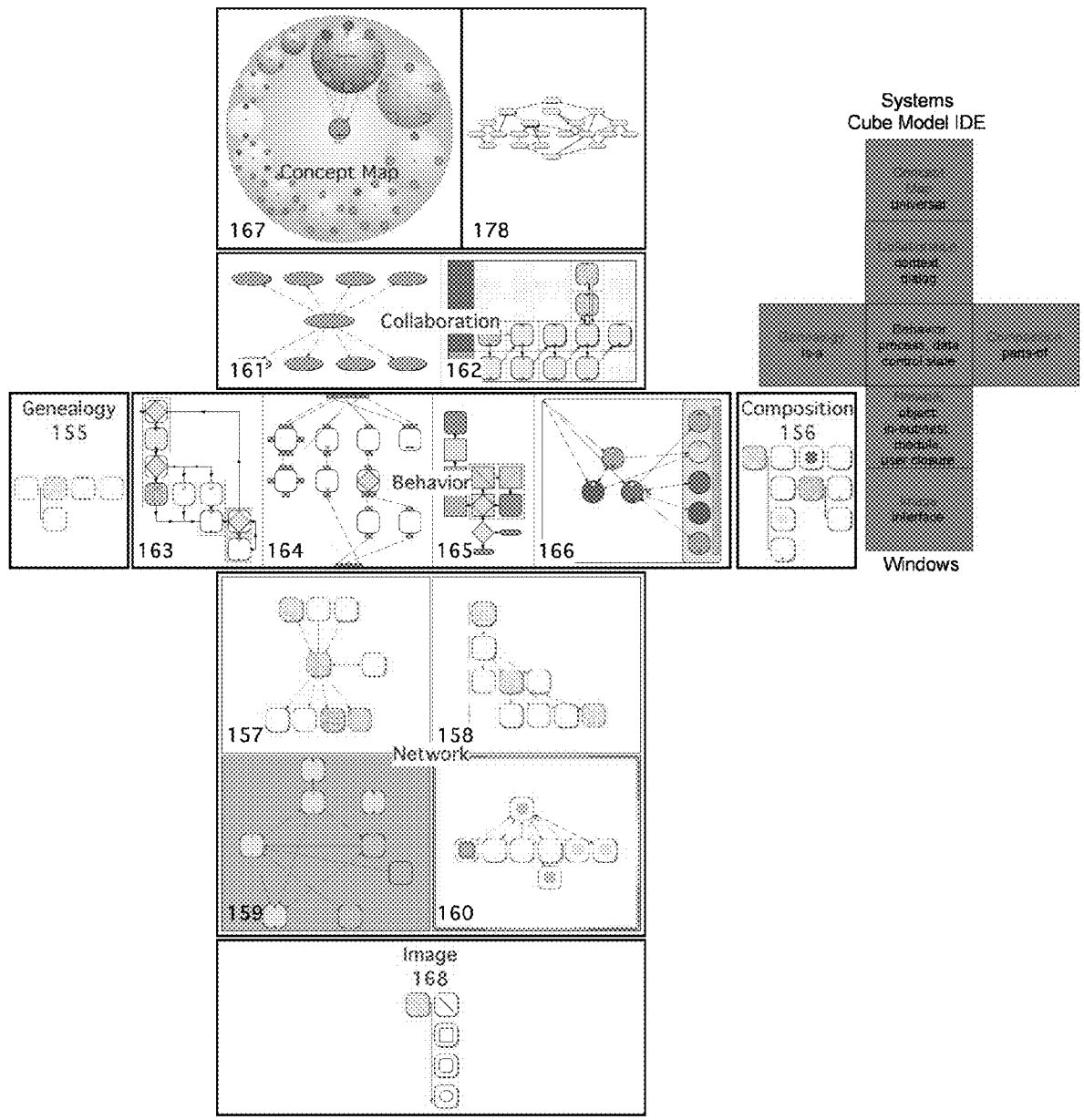
FIGS. 20-22 illustrate possible windows and sub-windows of an example embodiment of an integrated design environment (IDE)

As shown in FIG. 20, the example embodiment of the IDE may include a Genealogy Window 155, which may express both universal knowledge and particular knowledge.

1. Universal Knowledge and Concept Schema

Universal knowledge may be defined as rational belief and accepted theory, expressed as concepts. In the disclosed system, concepts are modeled in parent-child relationships (is-a), expressed as icons in concept schema in the Genealogy Window of the IDE. According to an embodiment, concepts may be grouped into three primary categories: feature, method, and math.

The "feature" concept category may be used to populate Concept Maps (Maps). A Map may contain features that may be sourced from one or more software repositories. According to an embodiment, there may be various different types of features in a Map.

A first example of a feature type may be called a "Concept" feature, which may be used to express a theory or idea.

A second example of a feature type may be called an "Association" feature, which may be used to express the relationship between a pair of concepts (e.g., a part-of relationship).

A third example of a feature type may be called a "Role" feature, which may be used to express the role one concept plays in its association with another concept (e.g., client/server).

A fourth example of a feature type may be called an "Occurrence" feature, which may be used to link a concept to an occurrence of a native/nonnative resource (e.g., Web Page, Web Service, Directory File, Database Records (nonnative), and Cubicon App, User Closure, Dialog Exchange, Plexus, Forum Post (native)).

A fifth example of a feature type may be called an "Aspect" feature, which may be used to group concepts with a common characteristic (e.g., genre of music).

A sixth example of a feature type may be called a "Credential" feature, which may be used to control a third-party's access to an occurrence of a resource (e.g., a characteristic of a person, such as a training certificate).

Other examples of feature types may be possible as well.

The method concept category may be used to express common behavior. A particular method may be shared by more than one context/template. According to an embodiment, there may be various different types of methods.

A first example of a method type may be called a "Role Control" method, which may be used to control access to a native/nonnative resource, referenced through a concept in a Concept Map (e.g., a set of conditions that need to be met, such as time of day, or a person's characteristic like a job responsibility).

A second example of a method type may be called a "Shared Accessor" method, which may be used to represent a function that is shared by multiple template types (e.g., a math result).

A third example of a method type may be called a "Shared Activator" method, which may be used to represent a procedure shared by multiple template types (e.g., a sort routine).

A fourth example of a method type may be called a "Foreign Function" method, which may be used to represent a functional subroutine written in a programming language other than the disclosed systems language (e.g., a math result).

A fifth example of a method type may be called a "Foreign Procedure" method, which may be used to represent a procedural subroutine written in a programming language other than the disclosed systems language (e.g., a sort routine).

Other examples of feature types may be possible as well.

The "math" concept category may be used to express math abstractions. According to an embodiment, there may be various different types of math abstractions A first example of a math abstraction type may be called a "Shared Equation" abstraction, which may be used to represent a mathematical transformation/shared by multiple methods. (e.g. $E=MC^2$).

A second example of a math abstraction type may be called a "Units of Measure" abstraction, which may be used to represent NIST's system of units (SI) as extensions to numeric data types.

A third example of a math abstraction type may be called a "Unit Converter" abstraction, which may be used to convert a particular unit of measure from one attribute value to another.

Other examples of math abstraction types may be possible as well.

2. Particular Knowledge and Template Schema

Particular knowledge may be defined as reasoning based on known facts or past events, rather than making assumptions or predictions. This knowledge type is commonly known as information or data. In the disclosed system, data may be expressed in attribute slots in a template (which may be considered a variation of an object-oriented programming class). Templates are modeled in parent-child relationships (is-a), expressed as icons in template schema in the Genealogy Window 155 of the IDE.

A template may define a type of slot structure that may be comprised of multiple slot types, the most common of which are attribute, object link, and method. As noted above, attribute slots may be used to hold data, object link slots may be used to reference other metaobjects, and method slots may be used to express behaviors. In one implementation, attribute and object link slots may also be shared with other software repositories, accessed through a list in a particular software repository's "slot dictionary."

B. Composition Window

As shown in FIG. 20, the example embodiment of the IDE may also include a Composition Window 156, which may function in conjunction with a composition schema to model blocks in parts-of-a-whole (association) relationships.

Figure 23:
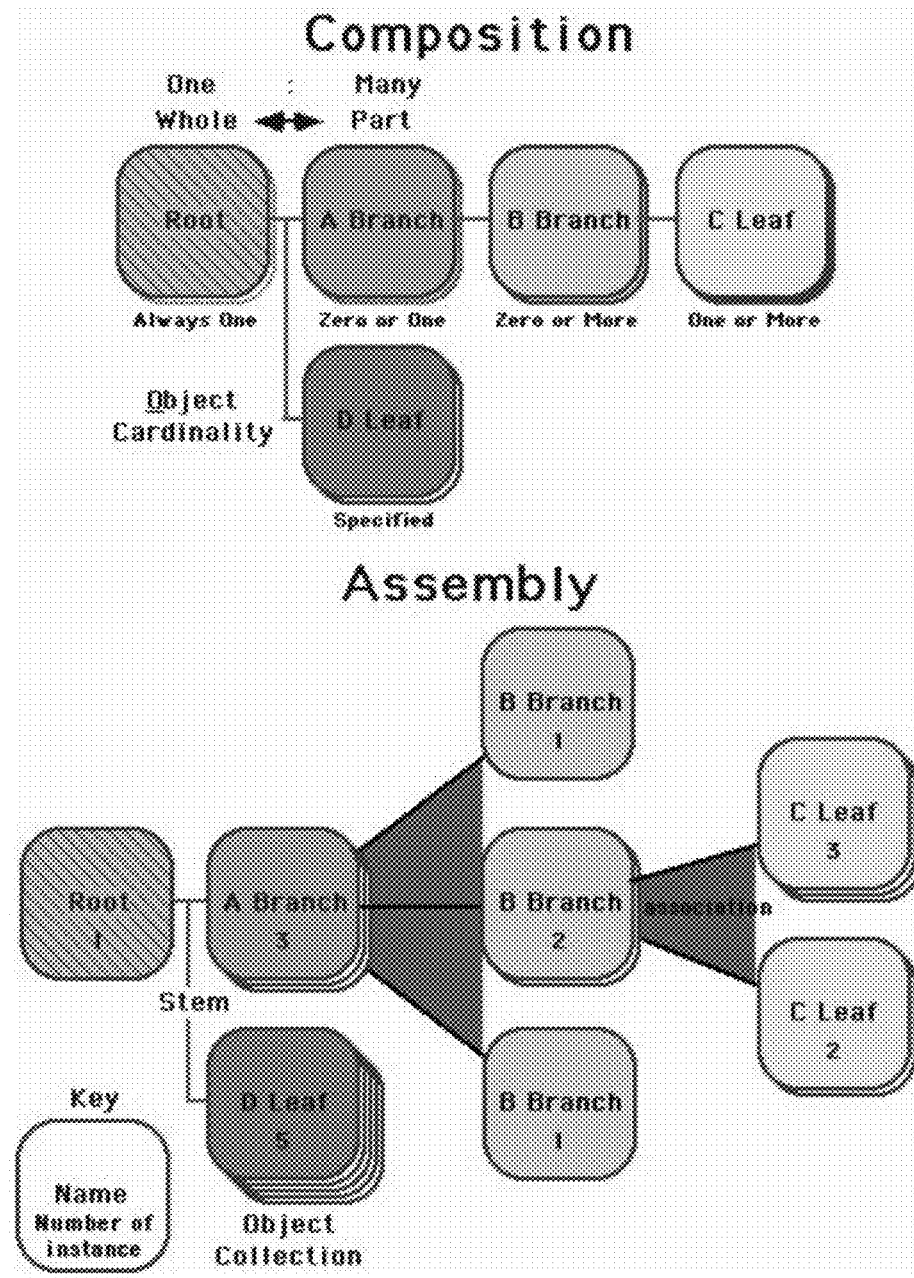
FIG. 23 illustrates one example of a composition schema that may be used with a composition window in the example embodiment of the IDE.

A composition schema is a tree-like structure composed of empty object or record blocks held in its root, branches and leaves. One example of such a schema is illustrated in FIG. 23. During design time, a block may be declared with a cardinality that constrains the number of objects/records it can potentially hold in a collection (at run time).

C. Network Window

As shown in FIG. 20, the example embodiment of the IDE may also include a Network Window, which may function in conjunction with a network schema to model complex dependencies between constituent parts of a software system. A network schema is typically comprised of objects and modules, connected by object links. A network schema may also be comprised of a mediator closure and widgets, connected by pane links. These network schema may take various forms.

According to a first example, the network schema may take the form of an Object In/Out schema 157, which may be used to link messages going in and out of a study object (object depicted in center of diagram).

According to a second example, the network schema may take the form of an Object Nest schema 158, which may be used to reference nested objects using object links.

According to a third example, the network schema may take the form of a Module schema be 159, which used to depict message pathways between objects in different modules of an app.

According to a fourth example, the network schema may take the form of a Mediator Closure schema 160, which may be used to depict widgets linked to a particular window or pane. This Mediator Closure schema may be comprised of a window or pane block that contains one or more widget blocks. A widget block may be comprised of one or more glyphs. A glyph may be comprised of one or more image elements (i.e. shapes, text, color) that may be created when a developer draws a particular element in the Image window. Elements are grouped into a glyph as a method step to simplify the GUI development process.

D. Collaboration Window

As shown in FIG. 20, the example embodiment of the IDE may also include a Collaboration Window, which may be used with a multitude of collaboration schemas 161,162 to model a software repository's component sharing strategies. For example, a software distribution schema may be used in conjunction with the Collaboration window to depict component sharing between two or more software repositories.

In the Collaboration window, there may be two "role" views for a given software repository: originate and adapt. In the originate view, the given software repository may be depicted as an icon in the center of the schema with outgoing arrows to other software repositories that are referencing one or more components from the given software repository. In the adopt view, a given software repository may be depicted as an icon in the center of the schema with incoming arrows from other software repositories from which the given software repository is referencing one or more components.

In the Collaboration window, there may also be two "reuse" views: sync and fork. In the sync view, software repositories that share versioned components may be depicted. With such versioned components, component copies may remain in synch with the original component, with updates to the original being sent to the repositories holding the copies so that the copies may be updated accordingly. These updates can be either be performed automatically or can be delayed for review. In the fork view, software repositories that share forked components may be depicted. With such forked components, component copies may potentially deviate from the component original, and updates to the original may not sent to the repositories holding the copies.

E. Behavior Window

As shown in FIG. 20, the example embodiment of the IDE may also include a Behavior Window, which may be used with four schemas to model relationships between tasks, steps or states.

For example, the Behavior Window may be used with a Process-flow schema 163 to express tasks, comprised of, sequential, branch, iterate and fork/join control constructs. A task's behavior is expressed as a control-flow method.

As another example, the Behavior Window may be used with a Data-flow schema 164 to express tasks that are interconnected, through data input and output sockets.

As yet another example, the Behavior Window may be used with a control-flow schema 165 to declare a method's steps, organized into sequential, branch and iterate control constructs. A step may reference local object data or remote object data through a message.

As still another example, the Behavior Window may be used with an FSM schema 166 to facilitate deterministic behavior in a hard, real-time system. Each real-time module expresses an FSM.

F. Concept Map Window

As shown in FIG. 20, the example embodiment of the IDE may also include a Concept Map Window 167, which may be used in conjunction with a Concept schema to express relationships between concepts that hold universal knowledge. There may be a plurality of map types: a domain's term space, a trustmark that may provide assurance that the bearer has been vetted, secure and control access to data, and infer knowledge by processing local and remote concepts.

G. Image Window

As shown in FIG. 20, the example embodiment of the IDE may also include an Image Window 168, which may be used in conjunction with one or more Image schema to model a multitude of "widget" component types that render all graphical elements of the IDE's GUI. As one example, an Image schema may be comprised of a window or pane closure block that contains one or more widget blocks, which may be comprised of one or more glyphs. A glyph may be comprised of one or more image elements (i.e. shapes, text, color) that may be created when a developer draws a particular element in the window. Elements in a glyph are grouped as a step icon to simplify the GUI development process.

Figure 24:
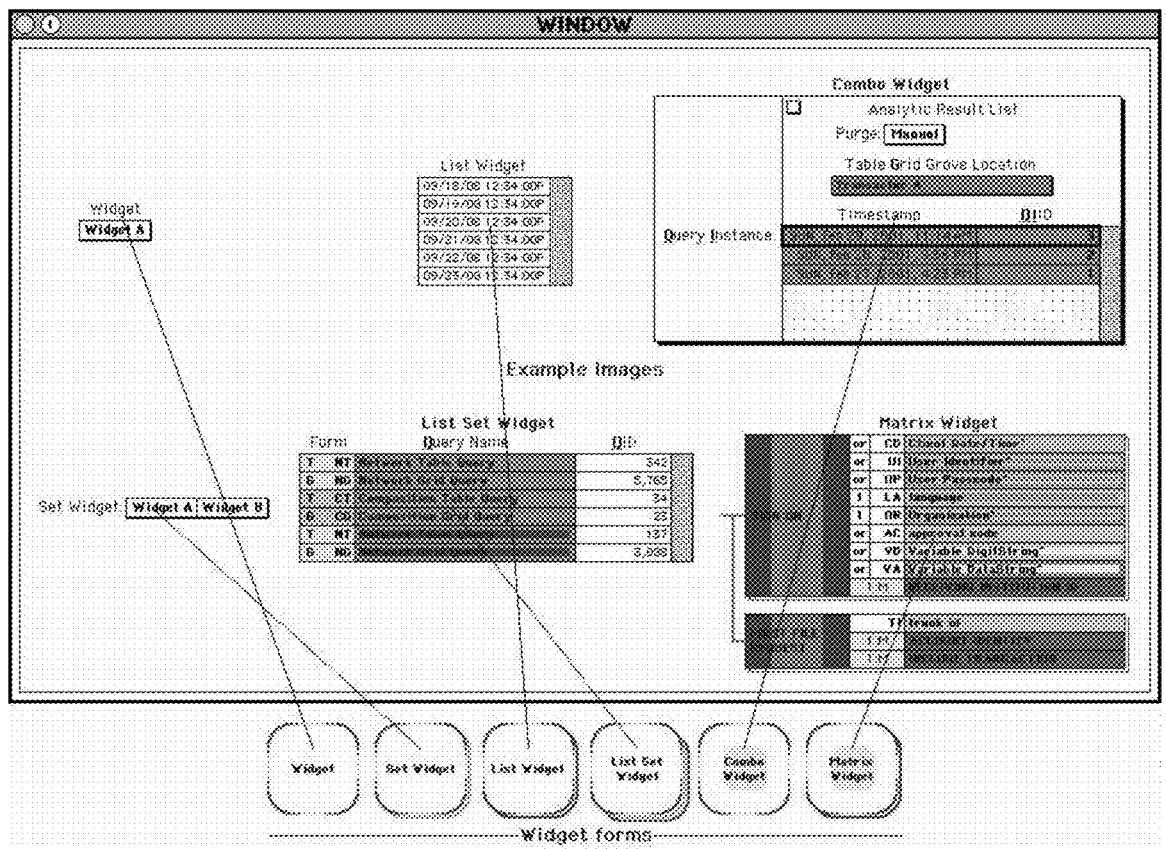
FIG. 24 depicts one possible example of widget types that may be used in the example embodiment of the IDE.

The widgets used in the disclosed IDE may take various forms. FIG. 24 depicts one possible example of widget types, along with possible images that each widget may render in a particular window or pane of the IDE.

A first example of a widget type may take the form of a single check box, radio button, slider, spinner, menu, toolbar, etc. This widget type may generally be referred to as a "Widget."

A second example of a widget type may be called a "Set Widget," and may take the form of a combination of widgets (e.g., text box with attached menu).

A third example of a widget type may be called a "List Widget," and may take the form of a vertical/horizontal series of fields.

A fourth example of a widget type may be called a "List Set Widget," and may take the form of a vertical/horizontal series of combination fields.

A fifth example of a widget type may be called a "Combo Widget," and may take the form of a list widget or a list set widget that is combined with one or more widgets and/or set widgets.

A sixth example of a widget type may be called a "Matrix Widget," and may take the form of a collection of list widgets or list set widgets.

Other examples of widget types may be possible as well, although in general, utilizing a limited number of possible widget types may assist in the GUI development process.

Figure 25:
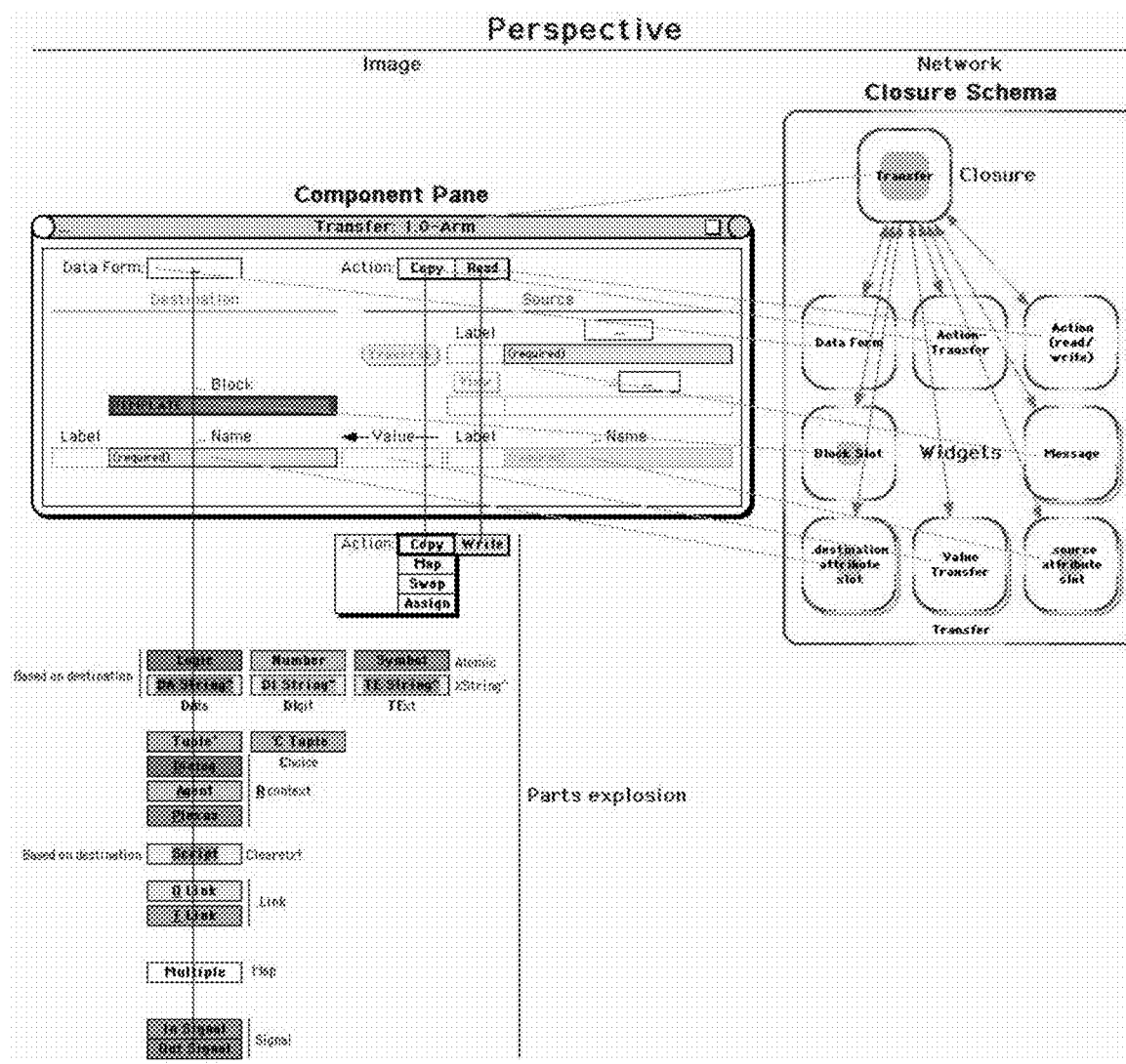
FIG. 25 depicts one possible example of a closure schema for an example component that is viewed from both a network perspective and an image perspective in the example embodiment of the IDE.

In operation, a user closure may be used to reference widgets responsible for rendering graphical elements in a particular pane of the IDE. FIG. 25 depicts one possible example of a closure schema for the example "Transfer: 1.0-Arm" component that is viewed from both a network perspective in the Network window of the IDE (shown on the right) and an image perspective in the image window of the IDE (shown on the left).

In this example, each particular widget in the user closure schema (shown in the network perspective on the right) is mapped to the particular slot or field it rendered as a graphical element in the "Transfer: 1.0-Arm" component's pane (shown in the image perspective on the left). To deepen a developer's understanding of a particular pane's function, widgets can be displayed in a "parts explosion" by selecting an option in the Image window.

In practice, the process that may be used to render the IDE's GUI may also be used to render GUIs for contexts and apps; another example of the reflexive nature of the disclosed systems language.

The IDE may thus allow the developer to visualize one particular component from multiple schema perspectives. FIG. 22 illustrates how windows/schemas of an example embodiment of the disclosed IDE may show different perspectives of an example "Dictionary" component. (It should be noted that the example does not show the Concept Map window, as that particular perspective is not relevant to the Dictionary component type.)

H. IDE Sub-Windows

In addition to the main windows described above, the example embodiment of the IDE may also include various sub-windows, which may extend the windows to include additional perspectives of a system. Examples of these sub-windows are depicted in FIG. 21, and described below.

A Discourse sub-window 190 may be used in conjunction with the Collaboration Window to develop an information exchange specification between a consumer and producer for a service called a Dialog context.

A Forum sub-window 192 (which is also depicted in FIG. 21 as sub-window 178) may be used in conjunction with the Collaboration Window to capture a network of posts (documents) that may utilize a process called transclusion to hyperlink the posts. Transclusion is the inclusion of a document or part of a document into another document by reference, A Interface sub-window 194 may be used to display the output of a user closure or system interface.

A Software sub-window 196 may lists all the software repositories that an entity owns or is a community member. The window displays a component directory that lists total instances of each component type that comprise the software repository, providing a quick moray to assess the extent of the intellectual property assets. The window is also used to adopt components from other software repositories on a sync or fork dependency basis.

An Entity sub-window 198 may be used to establish an entity's profile consisting of basics, domain machines, content distribution lists, employees, relationships codes, service geography/hours and roles for information exchanges and services.

A Domain sub-window 200 may be used to declare the operating environment that a machine executes. The window manages assemblies of machines, apps of modules, and constellations of things in a highly automated manner. A grouping of things operates over a low-power protocol.

A Discovery sub-window 202 may be used to search for an existing entity, component, service or Concept Map. The developer enters key word/s and/or search criteria into this sub-window and the sub-window returns related resources.

A open Dialog sub-window 204 may be used to conduct a discourse through a dialog exchange manually through human interaction. This platform capability of manual dialog exchange eliminates need to declare internal system logic or a connector to an external system to participate in a dialog.

An Access Set sub-window 206 may be used to establish service access rights to its grove and dialog complex data, and apps. For example, a service access set assigned to a grove may enable reading and writing of particular parts of an assembly. As another example, a service access set assigned to a dialog context may enable select nested sterns from being exchanged with a consumer. An encrypted stem function requires a public key exchange from producer to consumer for reading attribute data. As yet another example, a service access set assigned to an app may control what consumer can access the software for download into a machine.

A Credential sub-window 208 may be used by a server entity to control access to its domain using a combination of agent behavior, Concept Map navigation and occurrence links. A client entity must have been issued a credential by the server entity. The credential contains attributes used to determine access permission to the concepts of a Concept Map, context data, and (resource) occurrences.

A Certificate sub-window 210 may be used to authenticate attribute data through a relationship-based attribute certification process. Any attribute can be authenticated through the data verification process. This process comprises an entity submitting an attribute to an authenticator whom can verify the value or modify the value before completing process. The authenticator takes responsibility that the attribute's value is correct. This relationship-based authentication is a certification between the authenticator and source entity. This certification is simpler to establish than a conventional certification process because both entities already have base digital identity certification.

An Asset sub-window 212 may be used to control which employee and machine assets can perform a project task. Each employee may be declared with a unique set of privilege, capability, and history criteria, whereas each machine is declared only with history criteria. Three lists are generated for any selected employee; delegate peer, peer and subordinate. The institutional hierarchies will display zero or more escalation protocols depending upon the employee's task role(s). The Asset sub-window may also display their direct report escalating department levels. A timetable can determine when an employee or machine is available to perform an information exchange.

A Project sub-window 214 may be used to create, add, modify and review multiple content artifacts by team associates in a coordinated fashion. An employee or non-employee may also be a team associate. The allowance for non-employees to participate accommodates projects that cut across institutions. The team mechanism enables allocation of work based upon the condition that all associates have accepted a team role on a project. This mechanism enables team associates to process multiple content artifacts in an ad hoc fashion as a microcosm of a larger more rigid workflow that is based upon linear and ordered tasks.

A Dynamic sub-window 216 may be used to monitor heap and virtual memory utilization of each VM.

A Persistent sub-window 218 may be used to monitor storage of groves and content.

Other examples of sub-windows may be included as well.

cl VI. Virtual Machine

In accordance with the present disclosure, each machine may run at least one VM configured to obtain software from a software repository and then execute such software. In practice, this VM may execute the various modules.

For example, a VM may execute a Data Store module, which may maintain a persistent image of each grove, a runtime environment where all data is processed in a module context.

As another example, a VM may execute a "Memory Manager" module, which may execute garbage collection, heap compaction and data virtualization functions.

As yet another example, a VM may execute a Context Processor module, which may execute behaviors on object, matrix and binary tree data.

As still another example, a VM may execute an "Identity Manager" module, which may maintain absolute identifiers on all cyber and physical resources.

According to the present disclosure, a machine may also include an embedded hypervisor configured to manage the machine's at least one VM and maintain network sessions with the one or more VMs. In practice, this embedded hypervisor may perform tasks similar in scope to a traditional type 1 or type 2 embedded hypervisor. For example, in a type 1 configuration (bare metal), the hypervisor may be used to assign a particular thread to a processor core, where the thread will execute without interruption until all tasks are complete to assure its deterministic behavior. As another example, in a type 2 configuration (OS-hosted), the hypervisor may be used to allocate threads from the host OS to the hypervisor, which may result in a system's nondeterministic behavior.

A domain software repository may determine which parts of the hypervisor are required to execute a particular type of context or app. To minimize its footprint in power-constrained devices and things, only required parts of the hypervisor are downloaded.

Figure 26:
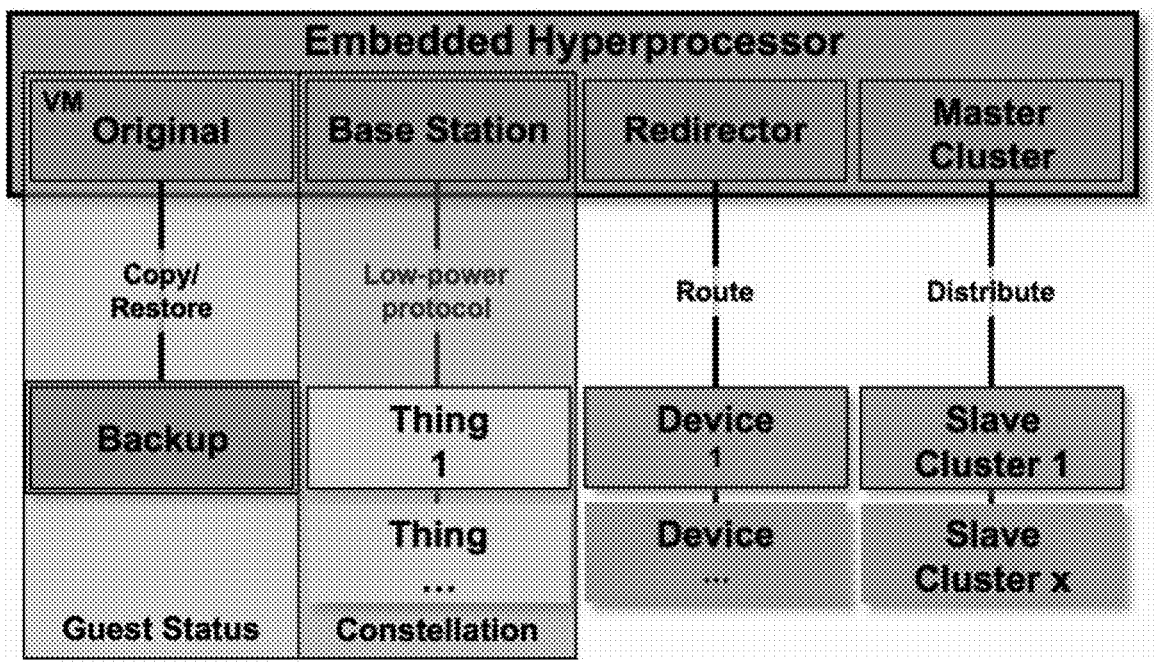
FIG. 26 illustrates possible roles for virtual machines in accordance with the present disclosure.

According to the present disclosure, a type 1/type 2 hypervisor may be comprised of one or more VMs that each perform a specialized role. These roles may generally be illustrated in FIG. 26.

For example, an Original VM may be used for generic functionality. As another example, a Backup VM may be used to as a backup for data in the Original VM, updated on a transactional basis. This Backup VM is preferably located in a different machine than the Original VM. As yet another example, the Base Station VM may be used to monitor and/or control a constellation, which may be considered a group of movable "things" that communicate over a particular low-power network. Additionally, the Base Station VM may coordinate a constellation's communications with other devices (over TCP/IP). As still another example, the Redirector VM may be used to redirect traffic in a particular router/switch by performing deep packet inspection (DPI) on content (dialog context) without parsing. As a further example, the Master Cluster VM may be used to perform load distribution for a blade server handling high-volume transactions. It dynamically assigns incoming requests to Slave Cluster VMs in other blade server/s. Other types of VMs may exist as well.

To "sandbox" (partition) data in a particular machine, entity A in domain A can assign guest status to one or more entities from one or more remote domains. Partitioning prevents an outsider's access to the entire hypervisor.

VII. Memory Manager Module

The Memory Manager module's efficient garbage collector is intended to manage a VM's deterministic behavior in hard real-time environments. Garbage collection is typically considered a form of automatic memory management.

Figure 27:
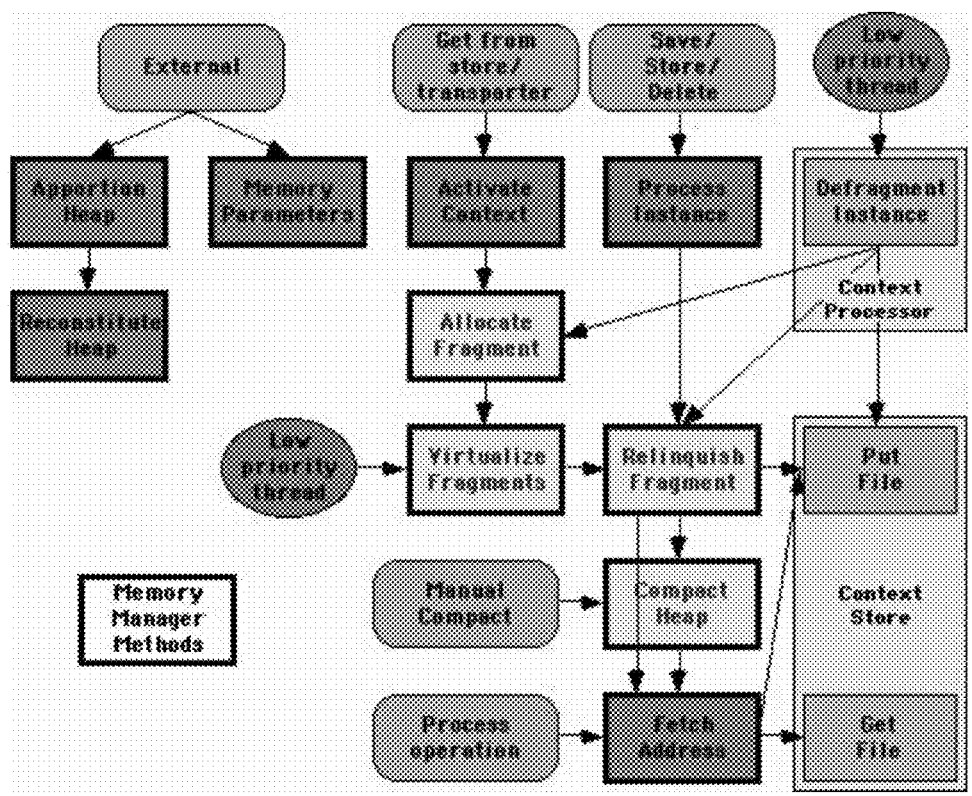
FIG. 27 depicts example methods of the disclosed Memory Manager module.

FIG. 27 depicts example methods of the Memory Manager module. The primary Memory Manager methods are allocate, relinquish, compact and virtualize. Methods are interleaved with processing tasks, with garbage collection events preferably performed at microsecond speed.

Figure 28:
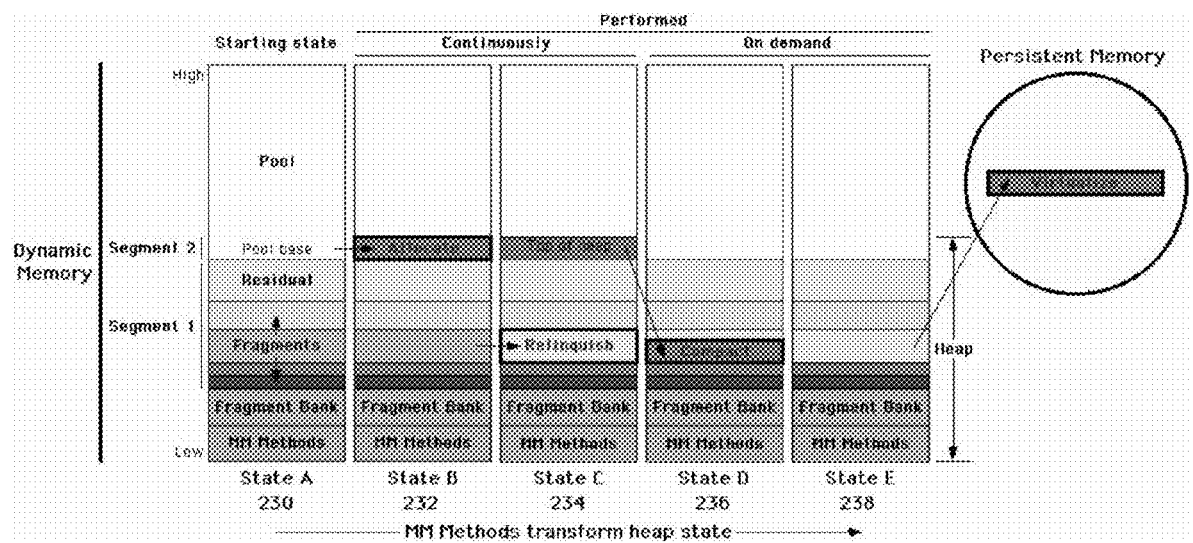
FIG. 28 depicts one possible embodiment of the disclosed Memory Manager.

FIG. 28 depicts one possible embodiment of a Memory Manager. The VM's dynamic memory is apportioned as a pool (empty memory—variable size), minus space for the Memory Manager methods and the initial fragment bank.

A fragment bank is a list of articles that reference the status and location (absolute address) of fragments in dynamic and persistent memory. The initial fragment bank is created with n-number of articles. When a bank runs out of articles, the Memory Manager's allocate method allocates a new fragment bank and segment.

When a whole/portion of a context is allocated to memory, the allocate method creates a new segment at the top of heap, known as the top segment. The byte count of a top segment is dictated by the size of the fragment—the "package" that holds the structures (data) and behaviors (methods) of the context in binary. A pointer is used to reference the fragment's absolute address in the heap. The fragment internally maintains relative addresses for each of its substructures and methods.

Memory Manager methods+initial fragment bank+Segment 1=heap. In this example, Segment 1 holds four fragments (shades of blue) and residual space (gray) 230.

When a context's structures are modified or retrieved from persistent memory, the memory's modify or load operation may evoke the allocate method to create a new fragment/segment. The allocate method uses the current address value of the pool base pointer to identify where the new fragment/segment will be placed in the heap, depicted as Segment 2 (232). That value is written into the next article in a fragment bank. Pool base pointer+new segment=new pool base.

When a context's structures are deleted or stored, or one or more of its methods go out of scope, they are considered &referenced. This triggers the relinquish method to deallocate the (structures/methods') fragments by changing their status from "live" to "dead," depicted as Segment 1 (234).

A dead fragment is considered "garbage," and as such becomes a candidate for collection. If all fragments in the top segment are dead, the segment becomes reabsorbed into the pool. If all fragments in a segment (other than top) are dead, the segment becomes a residual segment (empty memory—fixed size). If some fragments in a segment (other than top) are dead, the deallocated space becomes residual (residual space). To accommodate even larger fragments, the relinquish method consolidates adjoining residual segments as well.

To prevent delays in segment allocation, the Memory Manager evokes the compactor method and virtualize methods to maintain a sufficient pool size as the heap continues to grow.

The compactor method is used to create additional space in the pool. The method relocates fragment/s on the top of the heap (top segment—depicted as Segment 2 to the bottom of the heap (lowest residual space/segment that can accommodate fragment/s byte count, depicted as Segment 1 (236).

If the pool size remains insufficient after compaction, the virtualize method will be evoked. The method selects fragments with the longest dormant period for storage in persistent memory. In the fragment's article, its reference will be changed from a pointer to a persistent handle, 238. A particular fragment is recalled, it will be retrieved from storage.

The Memory Manager module may be encoded using C source code as a bootstrap.

VIII. Closure Mechanism

Figure 29:
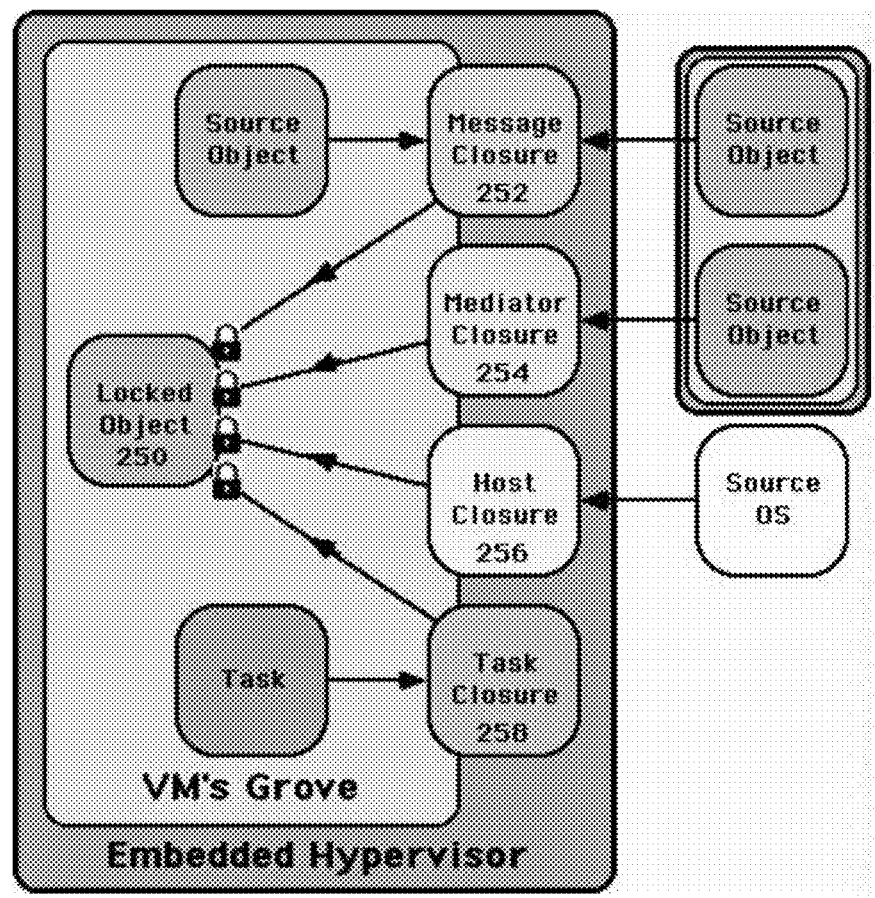
FIG. 29 illustrates an example of a closure type that may be responsible for managing interactions between a software repository and an IDE during a live design process.

During live design, a particular closure type may be responsible for managing "live" interactions between a particular software repository and an IDE. FIG. 29 illustrates one example of such a closure type.

A "closure" is a software transaction memory (STM) mechanism that uses locks to control shared access to a metaobject or metaobjects in a software repository, or an object or objects in a machine. A closure assures data is transformed within the boundary of an atomic transaction, meaning data is left in its original "status" if the transaction does not commit.

Following a successful commit, the current value(s) of the locked object/metaobject 250 will then be replaced with the value/s of the source object/metaobject. There are currently four closure types, although other types may exist as well.

A Message Closure may be used by a source object/metaobject (located in same/different grove) to either (1) read from a value in attribute slot or (2) write to method slot in a locked object/metaobject 252.

A Mediator Closure may be used by a source object/metaobject (located in different grove) to read from and/or write to attribute values in a locked object/metaobject 254.

A Host Closure may be used by a source OS (located in a Type 2 embedded hypervisor) to call a method that modifies one or more attribute values in a locked object/metaobject 256.

A Task Closure may be used by a task (located in the same grove) to read from and/or write to attribute values in a locked object/metaobject 258.

IX. Models of Computation

In the disclosed system, a Realtime or Transaction MoC may be used to design algorithms best suited for each instance of module context. In computational theory and computational complexity theory, a model of computation may be defined as a set of allowable operations used during the computation process and their respective costs.

Figure 30:
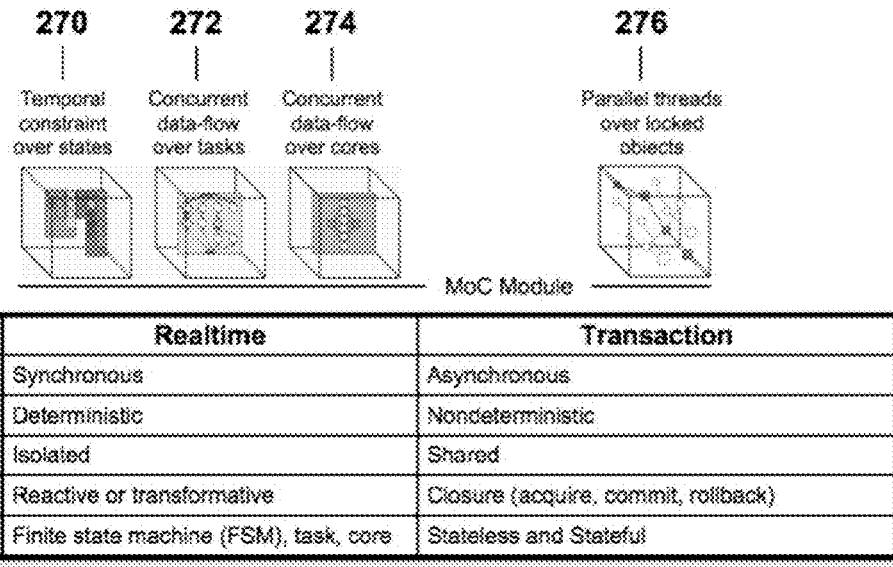
FIG. 30 depicts one possible example of Models of Computation (MoC) types that may be used in the disclosed system.

FIG. 30 depicts one possible example of MoC types that may be used in the disclosed system, although others may exist as well.

A. Realtime MoC

An FSM MoC 270 may be used to meet stringent processing deadlines. During execution, the FSM MoC may utilize a synchronous reactive mechanism in tandem with a finite state machine to manage a module's control-flow behavior over a tick period of time. Computations performed within a tick are assumed to be instantaneous, appearing as if the processor executing the computations were infinitely fast. Logical "ticks" of time make it easier to partition behaviors across state methods.

A Task MoC 272 may be used to simplify the development of data-flow programs using a pre-defined set of task icons that snap together like Legos.

A Core MoC 274 may be used to simplify the development of homogeneous concurrent programs. During execution, the Core MoC maps a particular task thread to a particular processing core that may be local (processor running in the host machine), or non-local (processor's running in remote machines located anywhere in the network).

B. Transaction MoC

A Transaction 276 MoC may be used to control access to shared memory. During processing, the Transaction MoC may employ a software transactional memory (STM) mechanism to lock particular shared objects in a module prior to a read or write action.

X. Communication Protocols

Figure 31:
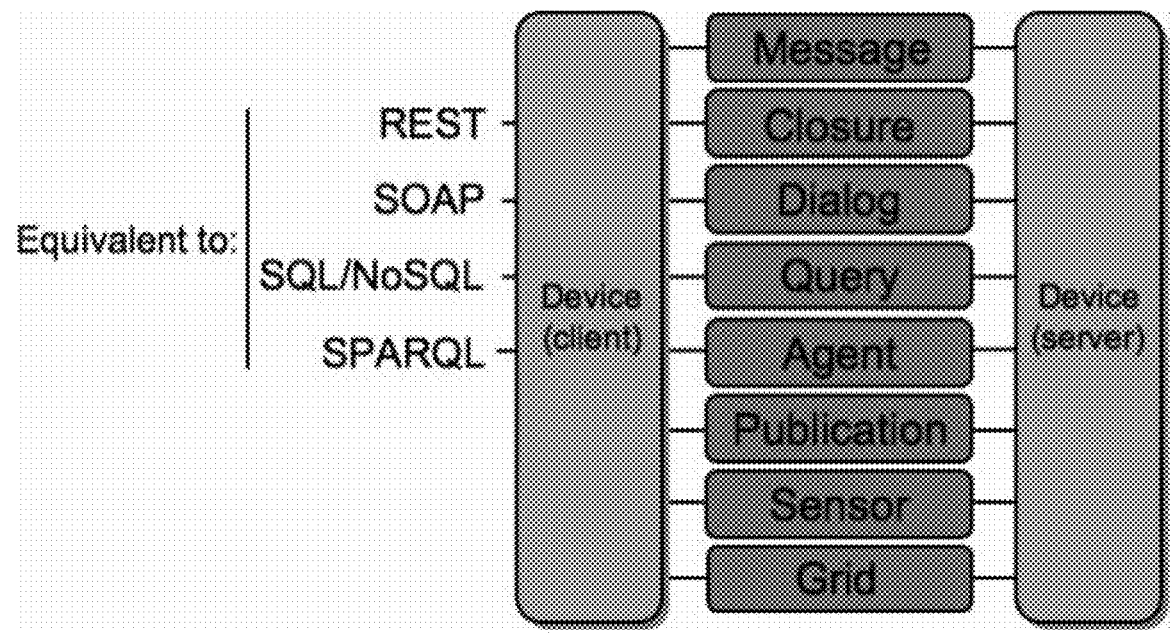
FIG. 31 depicts examples of communication protocols that may be used in the disclosed system.

Information exchanges in the disclosed system may be performed using a predefined set of communication protocols that may support different forms of machine-to-machine interactions. FIG. 31 depicts examples of communication protocols that may be used in the disclosed system, which will now be generally described.

The Message Protocol may be used to perform information exchanges that require discrete object-to-object interaction.

The Closure Protocol may be used to perform information exchanges that require parallel execution. Closure is similar in scope to the Web's REST protocol.

The Dialog Protocol may be used to perform information exchanges between disparate systems. Dialog is similar in scope to the Web's SOAP protocol.

The Query Protocol may be used to perform information exchanges that qualify/select Big Data for analysis.

The Agent Protocol may be used to perform information exchanges that support a machine's situational awareness.

The Publication Protocol may be used to perform information exchanges that distribute an entity's content. Publication is similar in scope to subscription as a service.

The Sensor Protocol may be used to perform information exchanges that require a realtime response to an environmental change from a machine.

The Grid Protocol may be used to perform information exchanges that utilize idle computing resources.

Other examples of communication protocols are possible as well.

XI. Identification of Resources

In accordance with the present disclosure, plurality of globally typed identifiers (GTIs) may be used to uniquely identify cyber (software) and physical (network-enabled hardware) resources operating in a network configuration.

Figure 32:
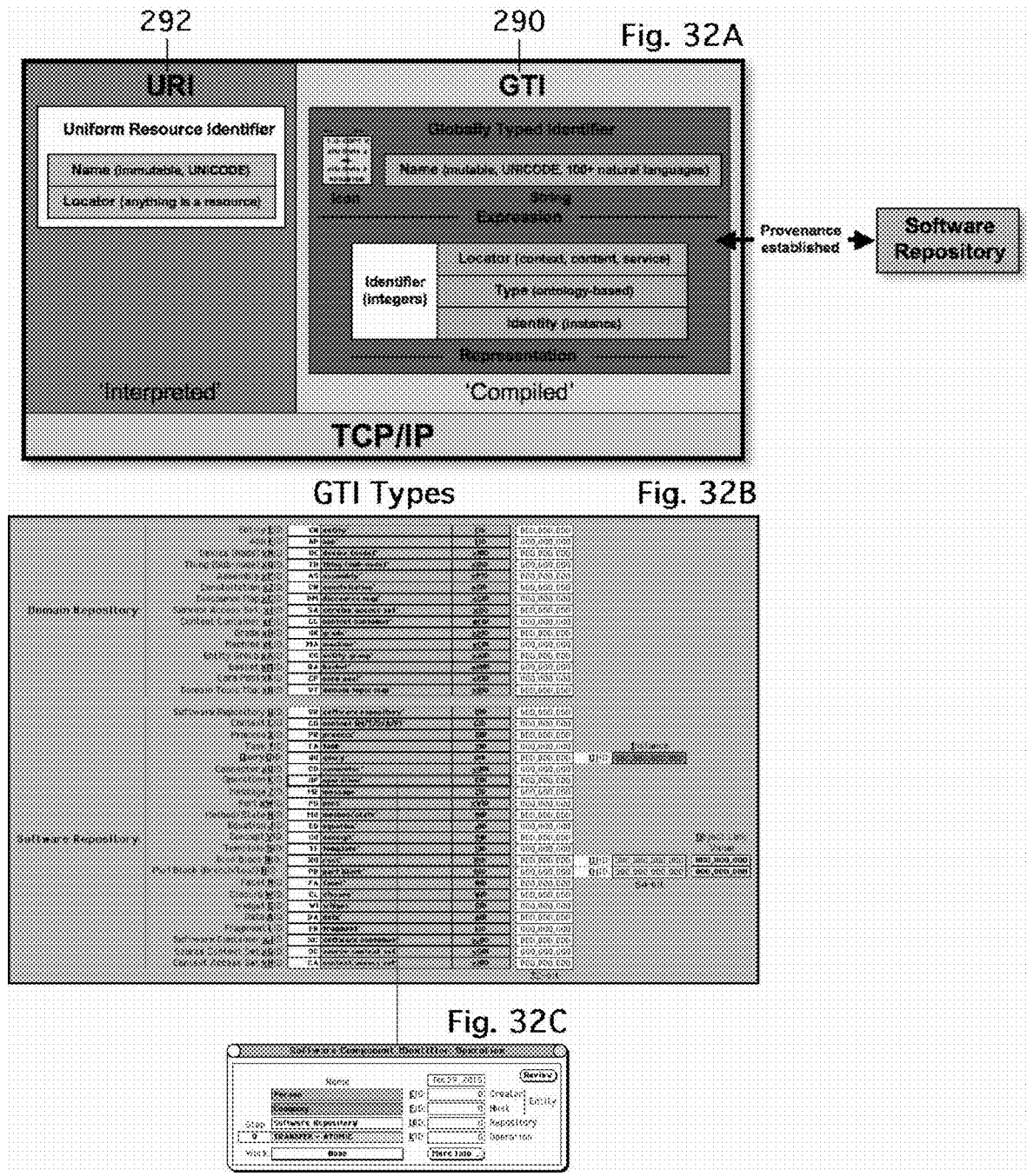
FIG. 32A illustrates one possible example of a globally-typed identifier (GTI) structure as compared to a Uniform Resource Identifier (URI) structure.
FIG. 32B depicts examples of possible GTI types that may be supported by the disclosed systems language.
FIG. 32C depicts an example of an IDE pane for a component identifier.

In practice, a GTI may be serve similar purpose to a Uniform Resource Identifier (URI). FIG. 32A illustrates one possible example of a GTI structure 290 as compared to a URI structure 292. As shown, the disclosed GTIs may be integer based, which may be more efficient to process than string-based URIs. A fitting comparison would be the efficiency of processing a compiled program versus an interpreted program.

FIG. 32B depicts examples of possible GTI types that may be supported by the disclosed systems language, depicted as slots. Examples of GTI types may include component identifiers, entity identifiers, and repository identifiers.

During software development, a GTI may be used to "digitally watermark" a component for the purpose of unique identity. Such a component identifier may take various forms. According to one example, a component identifier may be a concatenation of three 32-bit integers: (1) an entity identifier (e.g., developer of origin), (2) a domain/software identifier (e.g., software repository of origin—storage location), and (3) a component instance (e.g., instance of component type in said software repository). Further, such a component identifier may be depicted in a component popup pane in the IDE, an example of which is depicted in FIG. 32C. In other windows or panes in the IDE, depiction of a component identifier may be limited to component instance identifier only, which may provide a way to quickly identify a component.

An entity identifier (which may be abbreviated "EID") may identify a person, corporation, institution or government that operates in a network configuration. According to an implementation, an EID may be considered the base GTI.

XII. Example Use Case

The disclosed systems language can express software systems a substantially large number of domains. To help the USPTO examination process, we include the following software patent automation use case to demonstrate the disclosed systems language's applicability to a problem domain that an examiner must contend with on a day-by-day basis.

Certain inventions are most effectively summarized in pictorial form and patent professionals can rely heavily on patent drawings for performing prior art searches. Flowcharts represent a large and useful subclass of patent images. They have a special role in the patents domain since they offer a way to graphically represent a process.

Searching patent drawings is currently a labor-intensive, error-prone task that would be facilitated by automatic indexing methods. Generic methods for automatically indexing patent drawings have been researched, but the heterogeneity of patent drawings have complicated the development of practical machine translation capability.

The disclosed systems language takes a different approach towards capturing human expression of system processes in graphical form. Instead of trying to glean out meaning from flowcharts that do not capture a process's meaning, the disclosed systems language and associated live design process may capture meaning in the machine-understandable language without involving a software programmer.

Figure 33:
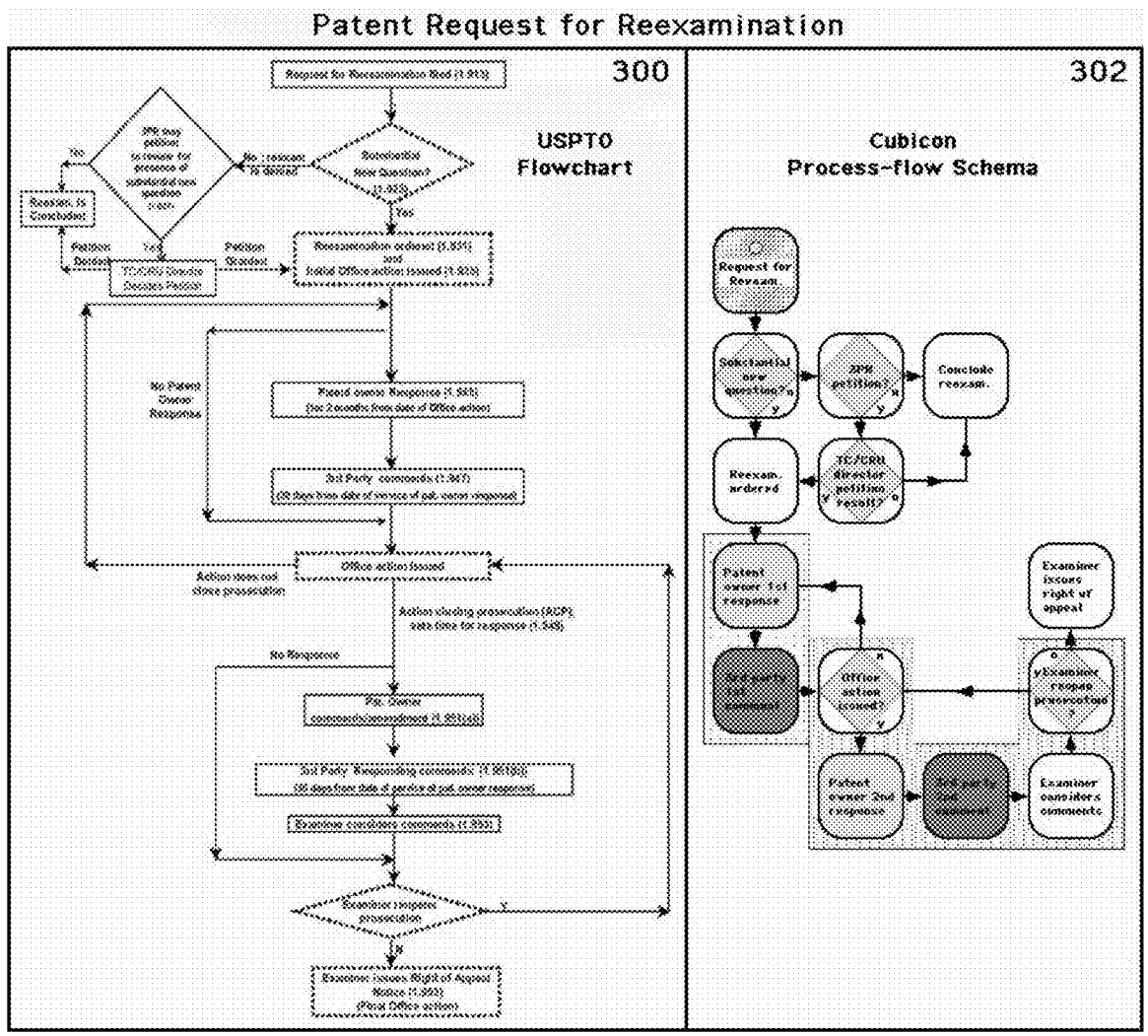
FIG. 33 depicts a high-level comparison between an example workflow process expressed as a typical flowchart and the workflow process expressed in accordance with the disclosed systems language.

To illustrate this, FIG. 33 depicts a high-level comparison between an example USPTO workflow expressed as a typical flowchart 300 published by the USPTO and that same USPTO workflow expressed as a Process-flow schema 302 designed according to the disclosed systems language. As shown, flowcharts are typically depicted—by the USPTO, in published patents and patent applications, and a variety of other applications—in a manner similar to flowchart 300. However, unlike the schema 302 designed according to disclosed systems language, this flowchart does not have a binary representation that can be used to automate the steps of the workflow.

In the Process-flow schema 302 for this workflow, each icon expresses a task that is represented by one or more metaobjects, and these icons may be interconnected using sequential, selective, iterative and fork/join process-flow constructs. As a result, a task like "Reexamination ordered" in the workflow may be automated by instigating an initial office action by issuing an exchange with another system or selecting a particular patent examiner based on a complex set of rules. This logic and command can be declared within the disclosed systems language directly by USPTO staff without conventional programming skills. Of course, this process automation is merely one possible example use of Cubicon numerous other uses exist.

In accordance with the present disclosure, the inherent syntax and semantics incorporated in the disclosed systems language allow for automation of searching for and identifying processes. One such application may be to automate the searching for and analysis of processes in Cubicon, thereby allowing for a more efficient identification of differences and similarities between processes, although many other applications exist as well.

XIII. Conclusion

Example embodiments of the disclosed innovations have been described above. Those skilled in the art will understand, however, that changes and modifications may be made to the embodiments described without departing from the true scope and sprit of the present invention, which will be defined by the claims.

The invention claimed is:
1. A method comprising:
receiving, at a first computer from a repository, a first instance of a first component, wherein said first instance of said first component comprises a first metaobject that provides a binary representation of the instance of the first component;
storing, at said repository, a first identifier of said first computer and that said first component has been received by said first computer;
receiving, at a second computer from said repository, a second instance of said first component;
storing, at said repository, a second identifier of said second computer and that said second instance of said first component has been received by said second computer;
receiving from said first computer, a first user-modified component representing a user modification to said first instance of said first component;
determining whether said user modification to said first instance of said first component is valid, wherein said first component includes a metaobject having at least one method slot defining a method for checking the semantics of said first component, wherein said determining whether said user modification to said first instance of said first component is valid includes retrieving, from said method slot, said method and employing said method;

when said user modification of said first instance of said first component is valid,
replacing said first instance of said first component in said repository with said first user-modified component;
determining, using said second identifier, that said second computer received said second instance of said first component; and
replacing said second instance of said first component at said second computer with said first user-modified component.

2. The method of claim 1, wherein determining whether said user modification to said first instance of said first component is valid comprises determining that said user modification is invalid, and wherein processing said user modification in accordance with the determining comprises:
rejecting said user modification; and
displaying a notification indicating that said user modification has been rejected.

3. The method of claim 1, further comprising:
receiving, at said first computer from said repository, an indication that said repository has made a further determination of whether said user modification is valid; and
displaying a notification indicating results from said further determination by said repository.

4. The method of claim 1, wherein both said first instance and said second instance of said first component comprise copies of an original instance of said first component that is stored in the repository.

5. The method of claim 1 wherein after replacing said first instance of said first component in said repository with said first user-modified component, said second identifier is updated to indicate that said first user-modified component has been received by said second computer.

6. The method of claim 1 wherein after replacing said first instance of said first component in said repository with said first user-modified component, said first identifier is updated to indicate that said first user-modified component is associated with said first computer.

7. A non-transitory computer-readable medium having instructions stored thereon that are executable to cause a computing system to:
receive, at a first computer from a repository, a first instance of a first component, wherein said first instance of said first component comprises a first metaobject that provides a binary representation of the instance of the first component;
store, at said repository, a first identifier of said first computer and that said first component has been received by said first computer;
receive, at a second computer from said repository, a second instance of said first component;
store, at said repository, a second identifier of said second computer and that said second instance of said first component has been received by said second computer;
receive from said first computer, a first user-modified component representing a user modification to said first instance of said first component;
determine whether said user modification to said first instance of said first component is valid, wherein said first component includes a metaobject having at least one method slot defining a method for checking the semantics of said first component, wherein said determining whether said user modification to said first instance of said first component is valid includes retrieving, from said method slot, said method and employing said method;
when said user modification of said first instance of said first component is valid,
replace said first instance of said first component in said repository with said first user-modified component;
determine, using said identifier, that said second computer received said second instance of said first component; and
replace said second instance of said first component at said second computer with said first user-modified component.

8. The non-transitory computer-readable medium of claim 7, wherein determining whether said user modification to said first instance of said first component is valid comprises determining that said user modification is invalid, and wherein processing said user modification in accordance with the determining comprises:
rejecting said user modification; and
displaying a notification indicating that said user modification has been rejected.

9. The non-transitory computer-readable medium of claim 7, further comprising:
receiving, at said first computer from said repository, an indication that said repository has made a further determination of whether said user modification is valid; and
displaying a notification indicating results from said further determination by said repository.

10. The non-transitory computer-readable medium of claim 7, wherein both said first instance and said second instance of said first component comprise copies of an original instance of said first component that is stored in the repository.

11. The non-transitory computer-readable medium of claim 7 wherein after replacing said first instance of said first component in said repository with said first user-modified component, said second identifier is updated to indicate that said first user-modified component has been received by said second computer.

12. The non-transitory computer-readable medium of claim 7 wherein after replacing said first instance of said first component in said repository with said first user-modified component, said first identifier is updated to indicate that said first user-modified component is associated with said first computer.

13. A system including:
a repository storing a first component comprising a first metaobject that provides a binary representation of said first component;
a first computer receiving from said repository a first instance of said first component, wherein a first identifier is stored at said repository, wherein said first identifier identifies said first computer and that said first instance of said first component has been received by said first computer;
a second computer receiving from said repository a second instance of said first component, wherein a second identifier is stored at said repository, wherein said second identifier identifies said second computer and that said second instance of said first component has been received by said second computer,
wherein said repository receives from said first computer a first user-modified component representing a user modification to said first instance of said first component,
wherein said repository determines whether said user modification to said first instance of said first component is valid, wherein said first component includes a metaobject having at least one method slot defining a method for checking the semantics of said first component, wherein said determining whether said user modification to said first instance of said first component is valid includes retrieving, from said method slot, said method and employing said method, and when said user modification of said first instance of said first component is valid, replacing said first instance of said first component in said repository with said first user-modified component;

determining, using said identifier, that said second computer received said second instance of said first component; and replacing said second instance of said first component at said second computer with said first user-modified component.

14. The system of claim 13, wherein determining whether said user modification to said first instance of said first component is valid comprises determining that said user modification is invalid, and wherein processing said user modification in accordance with the determining comprises:

rejecting said user modification; and displaying a notification indicating that said user modification has been rejected.

15. The system of claim 13 wherein said first computer receives from said repository an indication that said repository has made a further determination of whether said user modification is valid and said first computer displays a notification indicating results from said further determination by said repository.

16. The system of claim 13 wherein both said first instance and said second instance of said first component comprise copies of an original instance of said first component that is stored in the repository.

17. The system of claim 13 wherein after replacing said first instance of said first component in said repository with said first user-modified component, said second identifier is updated to indicate that said first user-modified component has been received by said second computer.

18. The system of claim 13 wherein after replacing said first instance of said first component in said repository with said first user-modified component, said first identifier is updated to indicate that said first user-modified component is associated with said first computer.

* * * * *